United States Patent
Her et al.

(10) Patent No.: US 10,133,422 B2
(45) Date of Patent: Nov. 20, 2018

(54) CURVED TOUCHED WINDOW FOR AN ORGANIC LIGHT EMITTING DEVICE

(71) Applicant: LG INNOTEK CO., LTD., Seoul (KR)

(72) Inventors: Jae Hak Her, Seoul (KR); Soung Kyu Park, Seoul (KR); Do Youb Kwon, Seoul (KR); Gwang Hei Choi, Seoul (KR); Gyu Rin Lee, Seoul (KR); Chung Wan Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 29 days.

(21) Appl. No.: 14/685,853

(22) Filed: Apr. 14, 2015

(65) Prior Publication Data
US 2015/0293634 A1    Oct. 15, 2015

(30) Foreign Application Priority Data

Apr. 14, 2014 (KR) .......... 10-2014-0044217
Jun. 10, 2014 (KR) .......... 10-2014-0070289

(51) Int. Cl.
*G06F 3/044* (2006.01)

(52) U.S. Cl.
CPC .... *G06F 3/044* (2013.01); *G06F 2203/04102* (2013.01); *G06F 2203/04103* (2013.01); *G06F 2203/04111* (2013.01); *G06F 2203/04112* (2013.01)

(58) Field of Classification Search
CPC ........... G06F 3/044; G06F 2203/04102; G06F 2203/04103; G06F 2203/04111; G06F 2203/04112
See application file for complete search history.

(56) References Cited

U.S. PATENT DOCUMENTS

| 2007/0074316 | A1 | 3/2007 | Alden et al. | |
| 2012/0262385 | A1* | 10/2012 | Kim | G06F 3/044 345/173 |
| 2014/0232950 | A1* | 8/2014 | Park | G06F 3/044 349/12 |
| 2014/0320765 | A1* | 10/2014 | Jiang | G06F 3/041 349/12 |

(Continued)

FOREIGN PATENT DOCUMENTS

| KR | 10-2008-0066658 A | 7/2008 |
| KR | 10-2013-0098774 A | 9/2013 |
| TW | M470315 | * 1/2014 |

*Primary Examiner* — Lisa Landis
(74) *Attorney, Agent, or Firm* — KED & Associates LLP

(57) ABSTRACT

The touch window includes a substrate divided into an active area and an unactive area; a first sensing electrode extending in a first direction on the active area of the substrate and including a plurality of first electrode parts and a connection part; a second sensing electrode extending in a second direction different from the first direction on the active area of the substrate and including a plurality of second electrode parts; an insulating layer disposed on top surfaces of the first electrode part of the first sensing electrode and the connection part to expose the second electrode part of the second sensing electrode; and a bridge electrode disposed on the insulating layer and connected to the exposed second electrode part of the second sensing electrode, wherein the insulating layer includes an open part.

16 Claims, 21 Drawing Sheets

(56) References Cited

U.S. PATENT DOCUMENTS

| | | | |
|---|---|---|---|
| 2015/0060125 A1* | 3/2015 | Stevenson | G06F 3/044 174/261 |
| 2015/0145787 A1* | 5/2015 | Wang | G06F 3/041 345/173 |
| 2015/0185960 A1* | 7/2015 | Kim | G06F 3/0412 345/175 |

* cited by examiner

CURVED TOUCHED WINDOW FOR AN ORGANIC LIGHT EMITTING DEVICE

CROSS-REFERENCE TO RELATED APPLICATIONS

This application claims priority under 35 U.S.C. § 119 to Korean Application Nos. 10-2014-0044217 filed on Apr. 14, 2014 and 10-2014-0070289 filed on Jun. 10, 2014, whose entire disclosures are incorporated herein by reference.

BACKGROUND

1. Field

The embodiment relates to a touch window.

2. Background

Recently, a touch panel, which performs an input function through the touch of an image displayed on a display device by an input device, such as a stylus pen, or a hand has been applied to various electronic appliances. The touch panel may be representatively classified into a resistive touch panel and a capacitive touch panel.

In the resistive touch panel, the position of the touch point is detected by detecting the variation of resistance according to the connection between electrodes when pressure is applied to the input device. In the capacitive touch panel, the position of the touch point is detected by detecting the variation of capacitance between electrodes when a finger of the user touches the capacitive touch panel. When taking into consideration the convenience of a fabrication scheme and a sensing power, the capacitive touch panel has been spotlighted in a smaller model touch panel recently.

Such a touch window may include a sensing electrode. The sensing electrode may include first and second sensing electrodes and a bridge electrode. The first and second sensing electrodes and the bridge electrode may be disposed on the same surface of a substrate.

The first sensing electrodes may be connected to each other through connecting parts formed integrally with the first sensing electrodes. The second sensing electrodes may be connected to each other through the bridge electrodes. For example, an insulating layer is interposed between the second sensing electrode spaced apart from each other and the bridge electrodes are formed on the insulating layer, such that the bridge electrodes may connect the second electrodes spaced apart from each other to each other.

Since the insulating layer is interposed only between the second sensing electrodes and the bridge electrodes are formed on the insulating layer, it is difficult to align the second electrodes, the insulating layer and the bridge electrodes with each other. When any one of the sensing electrodes, the insulating layer and the bridge electrodes is out of alignment, the second sensing electrodes may not be connected to each other through the bridge electrodes. In addition, although the first and second sensing electrodes should be formed to be spaced apart from each other, the first and second sensing electrodes may be connected to each other.

BRIEF DESCRIPTION OF THE DRAWINGS

The embodiments will be described in detail with reference to the following drawings in which like reference numerals refer to like elements wherein.

DETAILED DESCRIPTION

Figure 1:
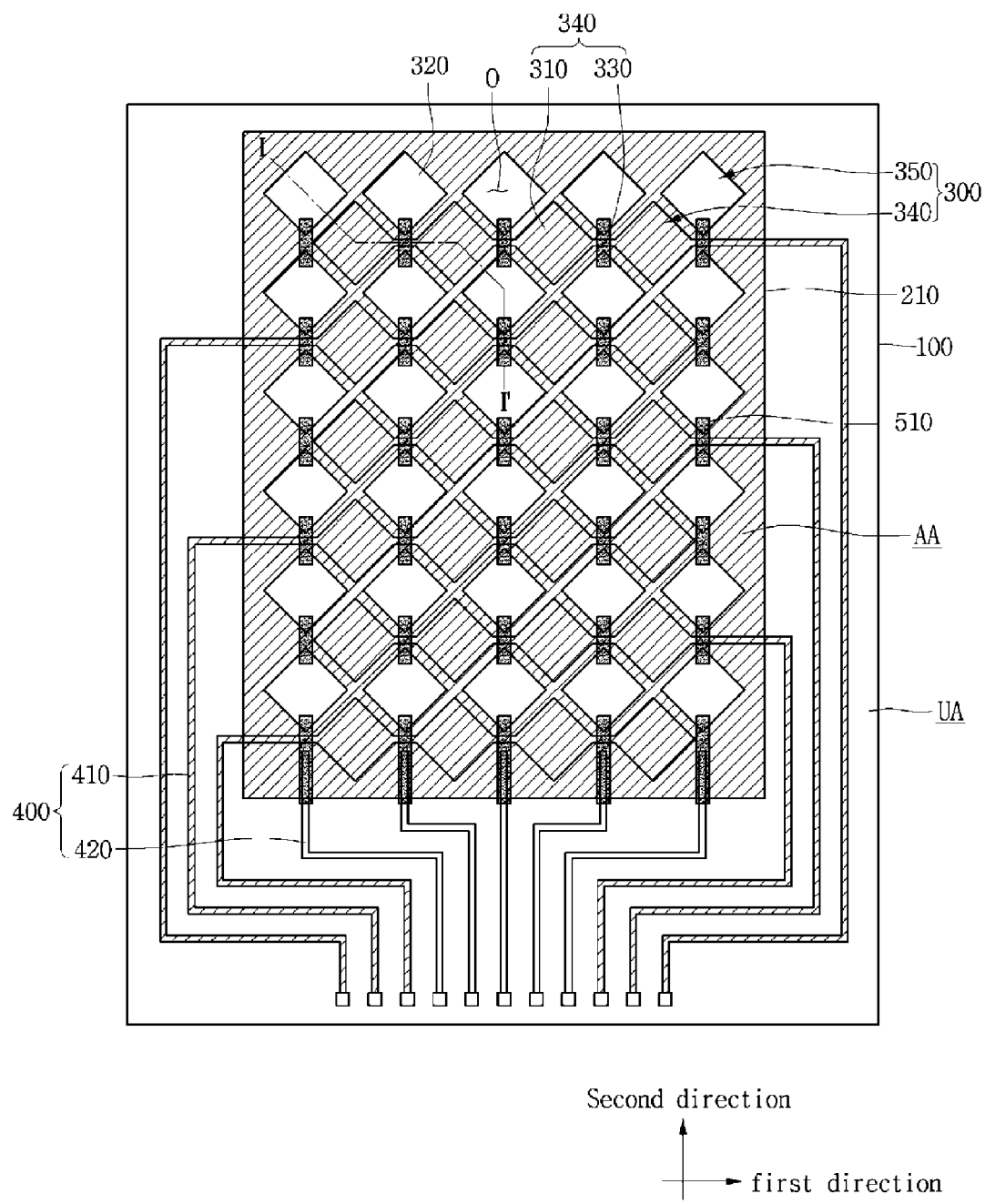
FIG. 1 is a plan view showing a touch window according to a first embodiment.
Figure 2:
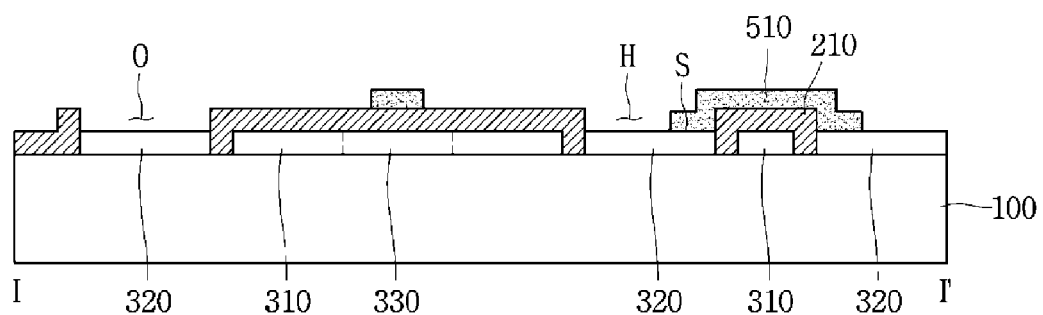
FIG. 2 is a sectional view taken along line I-I' of FIG. 1.

A touch window according to a first embodiment will be described with reference to FIGS. 1 and 2. The touch window according to an embodiment includes a substrate 100 which is divided into an active area AA and an unactive area UA. In detail, the active area AA signifies an area through which a touch instruction of a user may be input. The unactive area UA, which is contrary to the active area AA, is not activated even if a user touches the unactive area UA, so the unactive area UA signifies an area through which any touch instructions cannot be input.

A sensing electrode 300 is configured to sense an input device may be formed on the active area AA. A wire 400 for connecting the sensing electrodes 300 may be formed on the unactive area UA. As not shown, a circuit board connected to the wire 400 may be placed in the unactive area UA.

If the input device or a finger touches the touch window, the variation of capacitance occurs in the touched part by the input device, and the touched part subject to the variation of the capacitance may be detected as a touch point. The touch window will be described in more detail below.

The substrate 100 may be formed of various materials which are capable of supporting the sensing electrode 300, the wire 400 and the circuit board. The substrate 100 may include glass or plastic. For example, the substrate 100 may include tempered glass, semi-tempered glass, soda lime glass, reinforced plastic or flexible plastic. The substrate 100 may include an optically isotropic film. For example, the substrate 100 may include cyclic olefin copolymer (COC), cyclic olefin polymer (COP), optically isotropic polycarbonate (PC), or optically isotropic polymethyl methacrylate (PMMA).

The substrate 100 may be a flexible substrate having a flexible property. The substrate 100 may be a curved or bended substrate. For example, the substrate 100 may include a glass substrate or a plastic substrate. The substrate 100 may include chemically tempered/semi-tempered glass, such as soda lime glass or aluminosilicate glass, reinforced/flexible plastic, such as polyimide (PI), polyethylene terephthalate (PET), propylene glycol (PPG), or poly carbonate (PC), or sapphire.

The substrate 100 may include an optically isotropic film. For example, the substrate 100 may include cyclic olefin copolymer (COO), cyclic olefin polymer (COP), optically isotropic polycarbonate (PC), or optically isotropic polymethyl methacrylate (PMMA).

The sapphire has superior electric characteristics, such as permittivity, so that a touch response speed may be greatly increased and a space touch such as hovering may be easily implemented. In addition, since the sapphire has high surface hardness, the sapphire is applicable to a cover substrate. The hovering refers to a technique of recognizing coordinates even at a slight distance from a display.

In addition, a touch window including the substrate 100 may be formed to have a flexible, curved or bended property. For this reason, the touch window according to the embodiment may be easily portable and may be variously changed in design.

The wire 400 is formed on the unactive area UA of the substrate 100. The wire 400 may allow an electrical signal to be applied to the sensing electrode 300. The wire 400 may include first and second wires 410 and 420. The wire 400 is formed on the unactive area UA such that the wire 400 may not be viewed.

The wire 400 may include a material equal to or different from that of the sensing electrode 300 formed on the active area AA. The wire 400 may include a conductive material. The wire 400 may include a conductive material, a metal or conductive polymer. In addition, the wire 400 may be formed through a process equal to or different from that of the sensing electrode 300.

Although not shown in the drawings, a circuit board connected to the wire 400 may be further placed. Various types of printed circuit boards may serve as the circuit board. For example, a flexible printed circuit board (FPCB) may be applied as the circuit board.

An outer dummy layer (not shown) may be formed in the unactive area UA of the substrate 100. The outer dummy layer may be coated with a material having a predetermined color so that the wire 400 and the printed circuit board connecting the wire 400 to an external circuit cannot be viewed from the outside. The outer dummy layer may have a color suitable for a desired outer appearance thereof. For example, the outer dummy layer includes black pigments to represent black. In addition, a desired logo may be formed in the outer dummy layer through various schemes. The outer dummy layer may be formed through deposition, print, and wet coating schemes.

The sensing electrode 300 may be formed on the active area AA of the substrate 100. The sensing electrode 300 may be disposed on the active area AA of the substrate 100 to serve as a sensor for sensing a touch. That is, the sensing electrode 300 may sense whether an input device such as a finger is touched thereon.

The sensing electrode 300 may include a conductive material. The sensing electrode 300 may include a transparent conductive material. For example, the sensing electrode 300 may include metal oxide such as indium tin oxide (ITO), indium zinc oxide (IZO), copper oxide, tin oxide, zinc oxide, or titanium oxide.

In addition, the sensing electrode 300 may include various metals having superior conductivity. For example, the sensing electrode 300 may include a nanowire film, a carbon nano tube (CNT), graphene, or conductive polymer.

In addition, the sensing electrode 300 may include a metal and be disposed in a mesh shape. For example, the sensing electrode 300 may include Cu, Au, Ag, Al, Ti, Ni or the alloy thereof. In this case, the mesh shape may be formed in random to prevent a moiré phenomenon. The moiré phenomenon occurs when periodical stripes overlap with each other. Since adjacent strips overlap with each other, a thickness of a strip is thickened so that the strip is spotlighted as compared with other stripes. Thus, in order to prevent such a moiré phenomenon, the conductive pattern may be provided in various shapes.

The conductive pattern may include an opening part and a line part. In this case, the line part of the conductive pattern may have a line width in the range of 0.1 μm to 10 μm. If the line width of the line part of the conductive pattern is equal to or less than 0.1 μm, the line part may not be fabricated. If the line width of the line part of the conductive pattern is equal to or less than 10 μm, the pattern of the sensing electrode 300 may not been viewed from an outside. Preferably, the line width of the line part of the conductive pattern may be in the range of 1 μm to 7 μm. More preferably, the line width of the line part of the conductive pattern may be in the range of 2 μm to 5 μm. Still more preferably, the line width of the line part of the conductive pattern may be in the range of about 1 μm to about 3.5 μm.

The opening part of the conductive pattern may have various shapes such as a polygonal shape including a rectangular shape, a diamond shape, a pentagon shape, or a hexagonal shape, or a circular shape and the opening parts may be regularly disposed. That is, the conductive pattern may have a regular shape.

However, the embodiment is not limited to the above, and the conductive pattern may have a random shape. That is, one conductive pattern may be provided with various opening parts.

When the sensing electrode 300 has a mesh shape, even though the sensing electrode 300 is formed of metal, the pattern may not be viewed. In addition, the resistance of the sensing electrode 300 may be reduced, so that the sensing electrode 300 may be applied to a large-size substrate 100. In addition, when the substrate 100 is bent, the sensing electrode 300 may be bent without any physical damage. Thus, the sensing electrode 300 may be applied to a large-size touch window, so that the touch window may be applied to a flexible or curved touch device. So, the bending property and reliability of the touch window may be improved.

The sensing electrode 300 may include conductive polymer. When the sensing electrode 300 may be formed of the conductive polymer, the sensing electrode 300 may include a transparent pattern. The sensing electrode 300 formed of the conductive polymer may be flexible so that the sensing electrode 300 may be applied to a flexible or curved touch device. In addition, a lightweight touch device may be formed of the conductive polymer which is a low-density material.

The sensing electrode 300 may include first and second sensing electrodes 340 and 350, and a bridge electrode 510.

The first and second sensing electrodes 340 and 350, and the bridge electrode 510 may include the same material or mutually different materials. In addition, the first and second sensing electrodes 340 and 350, and the bridge electrode 510 may be disposed on the same single surface of the substrate 100.

The first and second sensing electrodes 340 and 350 may be disposed on the active area AA to sense a touch. In detail, the first sensing electrode 340 may extend in a first direction on the active area AA, and the second sensing electrode 350 may be extend in a second direction different from the first direction. In this case, the first direction may be perpendicular to the second direction.

The first sensing electrode 340 may be connected to the first wire 410 formed on the unactive area UA. The second sensing electrode 350 may be connected to the second wire 420 formed on the unactive area UA.

The first sensing electrode 340 may include a plurality of first electrode parts 310 and connection parts 330. The first electrode parts 310 may extend in the first direction. In this case, the first electrode parts 310 may be connected to each other through the connection parts 330. The first electrode parts 310 and the connection parts 330 may be formed integrally with each other.

Although the first electrode parts 310 disposed in a rhombus shape are depicted in the drawings, the embodiment is not limited thereto and the first electrode parts 310 may be formed in various shapes such as a polygonal shape including a bar shape, a triangular shape and a rectangular shape, a circular shape, a linear shape, an H-shape or an elliptical shape.

The second sensing electrode 350 may include a plurality of second electrode parts 320. The second electrode parts 320 may extend in the second direction. The second electrode parts 320 may be connected to each other through the bridge electrode 510.

Although the second electrode parts 320 disposed in a rhombus shape are depicted in the drawings, the embodiment is not limited thereto and the second electrode parts 320 may be formed in various shapes such as a bar shape, a polygonal shape including a triangular shape and a rectangular shape, a circular shape, a linear shape, an H-shape or an elliptical shape.

The bridge electrode 510 is disposed on the insulating layer 210. The insulating layer 210 may be formed to expose the second electrode parts 320 of the second sensing electrode 350.

The bridge electrode 510 may be connected to the second electrode part 320 of the second sensing electrode 350 exposed through the insulating layer 210. That is, the bridge electrode 510 may be disposed to allow the second electrode parts 320 spaced apart from each other to be connected to each other in the second direction. In addition, the bridge electrode 510 may be disposed to connect the second sensing electrode 350 to the second wire 420.

For example, the bridge electrode 510 may be disposed in a bar shape. In detail, the bridge electrodes 510 may be disposed in a bar shape to be spaced apart from each other on the active area AA by a constant interval. Only, the shape of the bridge electrode 510 is not limited to the above and various shapes may be adopted if the second electrode parts 320 adjacent to each other are connected to each other in the second direction.

The insulating layer 210 may be disposed on the sensing electrode 300. The insulating layer 210 may include an open part O.

In detail, the insulating layer 210 may be disposed on top surfaces of the first electrode part 310 and the connection part 330 of the first sensing electrode 340. In this case, the insulating layer 210 may be disposed to make direct contact with the top surfaces of the first electrode part 310 and the connection part 330.

In addition, the insulating layer 210 may be formed to expose the second electrode part 320 of the second sensing electrode 350. For example, the second sensing electrode 350 may expose at least a part of the second electrode part 320 through the open part O. And, the open part O may include a contact hole H. The contact hole H may expose a contact area S of the second sensing electrode 350 for making contact with the second electrode 350 and the bridge electrode 510. In this case, the open part O may be formed to be larger than the contact area S of the second sensing electrode 350. Therefore, the alignment of the second sensing electrode 350, the insulating layer 210 and the bridge electrode 510 may be prevented from being misaligned with each other.

In another aspect, the open part O may be formed to be larger than a plane width of the bridge electrode 510. Thus, the alignment of the second sensing electrode 350, the insulating layer 210 and the bridge electrode 510 may be prevented from being misaligned with each other.

In detail, the insulating layer 210 may be formed to make direct contact with the top and side surfaces of the first electrode part 310 and the connection part 330 and to expose at least an area of the top surface of the second electrode part 320. In more detail, the insulating layer 210 may be formed on the entire surface of the active area AA and include the open part O formed in an area corresponding to the second electrode part 320.

That is, the insulating layer 210 may include the open part O formed in the area corresponding to the second electrode part 320. In this case, the open parts O of the insulating layer 210 may one-to-one correspond to the second electrode parts 320. For example, there may exist at least one contact hole H corresponding to the second electrode part 320. That is, the second electrode parts 320 adjacent to each other may be connected to each other through the single contact hole H by using at least two bridges.

Meanwhile, one open part O may be formed on the single second electrode parts 320. The size of the open part O of the insulating layer 210 may be equal to or greater than 10000 dges. is, the second ethe size of the open part O may be equal to or greater than 50001 to or greater than 10000 dges. is, the second electrode parts 320 adjacent toer than 200e si200e The size of the open part O of the insulating layer 210 may be equal to or less than that of the second electrode part 320. Preferably, the size of the open part O of the insulating layer 210 may be substantially equal to that of the second electrode part 320.

In addition, the open part O of the insulating layer 210 may have the same shape as the second electrode part 320. Only, the shape of the open part O of the insulating layer 210 is not limited to the above, but the open part O of the insulating layer 210 may be formed to have various shapes. That is, the open part O of the insulating layer 210 may have a shape configured to expose the second electrode part 320 and to connect the second electrode part 320 to the bridge electrode 510 through the open part O.

A method of forming the insulating layer 210 is as follows. The first electrode part 310 and the connection part 330 of the first sensing electrode 340 and the second electrode part 320 of the second sensing electrode 350 are formed on the substrate 100. In addition, an insulating material layer is formed on the first electrode part 310, the connection part 330 and the second electrode part 320. Then, the insulating material layer formed on the second electrode part 320 is etched to form the insulating layer 210 including the open part O for opening the second electrode part 320. However, the method of forming the insulating layer 210 is not limited to the above, and various methods can be adopted if the methods can form the insulating layer 210 including the open part O for opening the second electrode part 320.

When the insulating layer is formed only on a crossing area between the first and second electrodes or the open part O of the insulating layer is formed only on a connecting area between the second electrode and the bridge electrode, it is difficult to adjust the alignment of the second sensing electrode, the insulating layer and the bridge electrode.

That is, it is difficult to match the alignment of the second sensing electrode, the insulating layer and the bridge electrode and a precise process is required. In addition, when the alignment is mismatched, the second sensing electrodes may not be connected to each other through the bridge electrodes. Further, the first and second sensing electrodes configured to be spaced apart from each other may be connected to each other.

The insulating layer 210 of the touch window according to the embodiment may be formed on the entire surface of the active area AA and may include the large open parts O one-to-one corresponding to the second electrode parts 320. Thus, alignment tolerances of the second sensing electrode 350, the insulating layer 210 and the bridge electrode 510 formed on the insulating layer 210 may be secured.

That is, the second sensing electrode 350, the insulating layer 210 and the bridge electrode 510 may be prevented from being misaligned. In addition, even if there is a little misalign, a connection between the second sensing electrode 350 and the bridge electrode 510 may be improved and the first and second sensing electrodes 340 and 350 may be prevented from being electrically connected to each other.

Although not shown in the drawings, the touch window according to the embodiment may further include a cover substrate disposed on the substrate 100 on which the sensing electrode 300 and the wire 400 are formed. That is, the cover substrate may be disposed on the substrate 100 on which the first and second sensing electrodes 340 and 350, the insulating layer 210 and the bridge electrode 510 are formed.

A transparent adhesive layer may be formed between the substrate 100 and the cover substrate. For example, the transparent adhesive layer may include optically clear adhesive (OCA) or optically clear resin (OCR).

Figure 3:
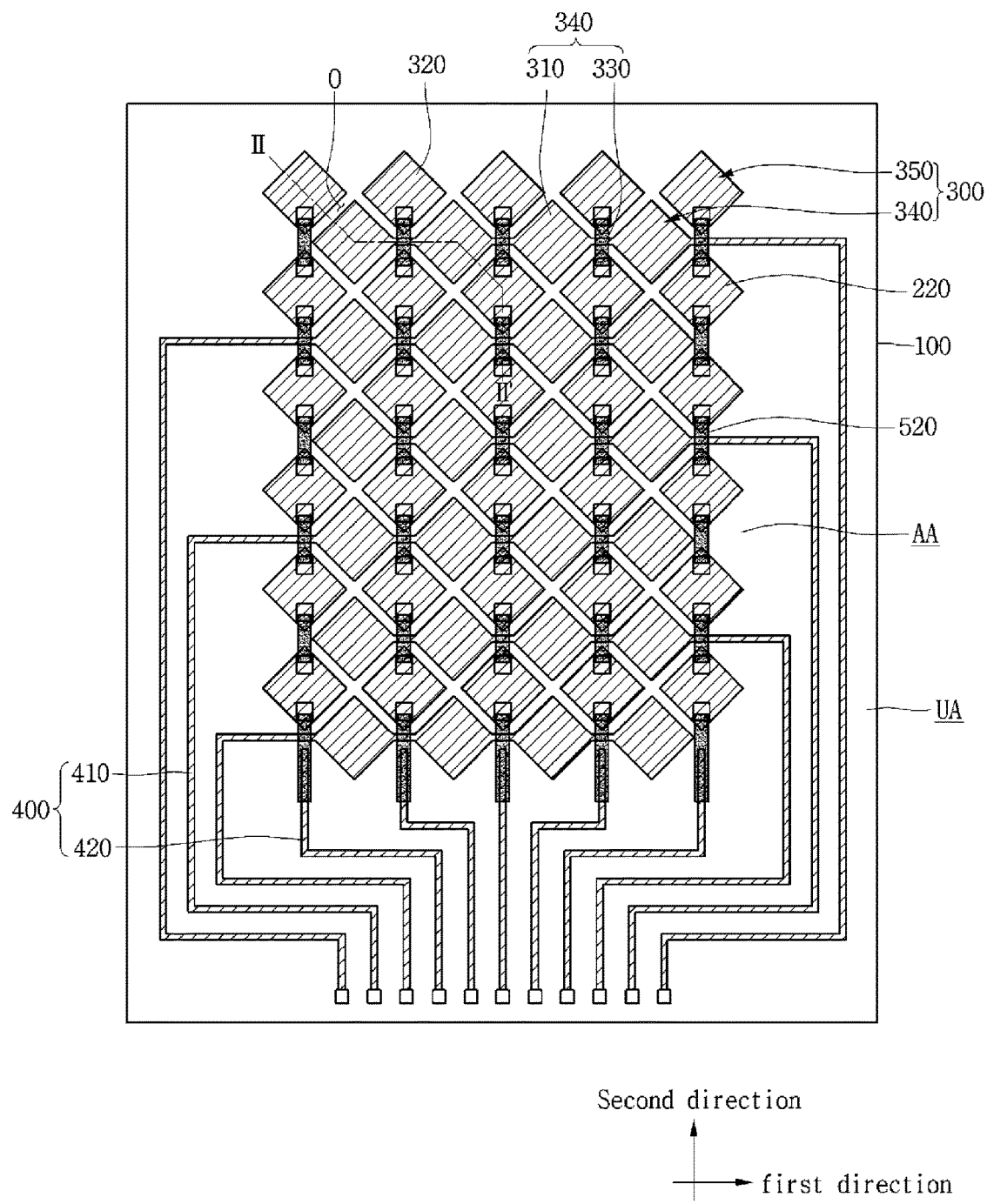
FIG. 3 is a plan view showing a touch window according to a second embodiment.
Figure 4:
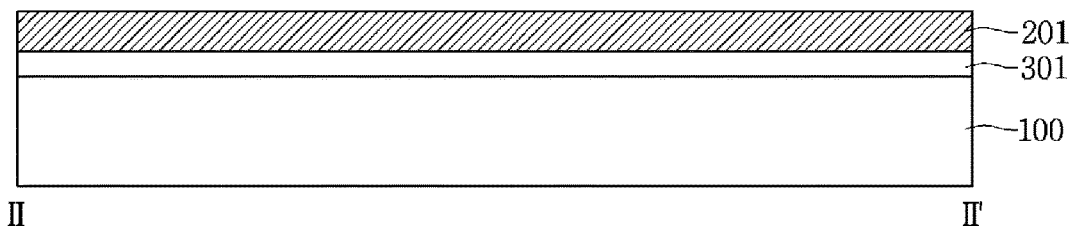
FIGS. 4 to 8 are views illustrating a method of manufacturing a touch window according to a third embodiment.
Figure 5:
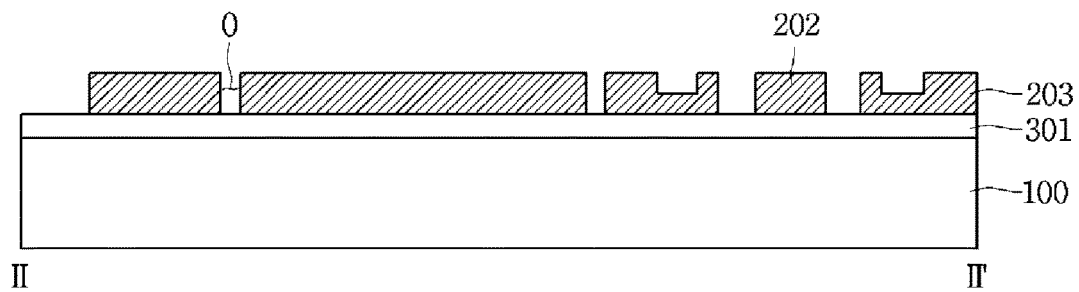
Figure 6:
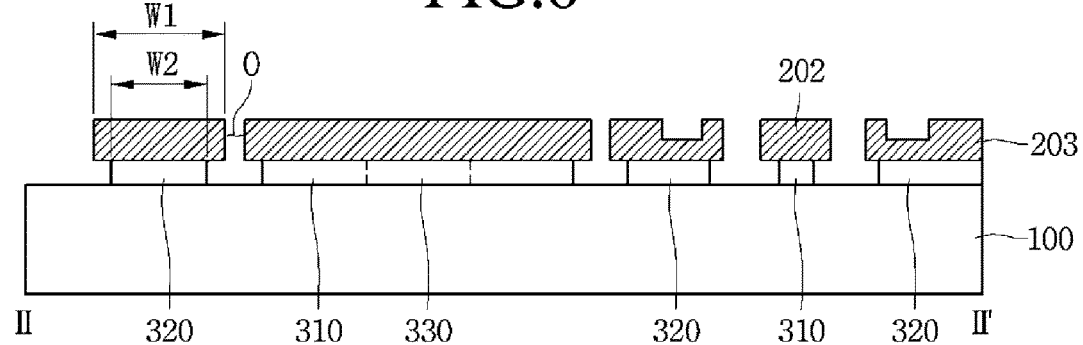
Figure 7:
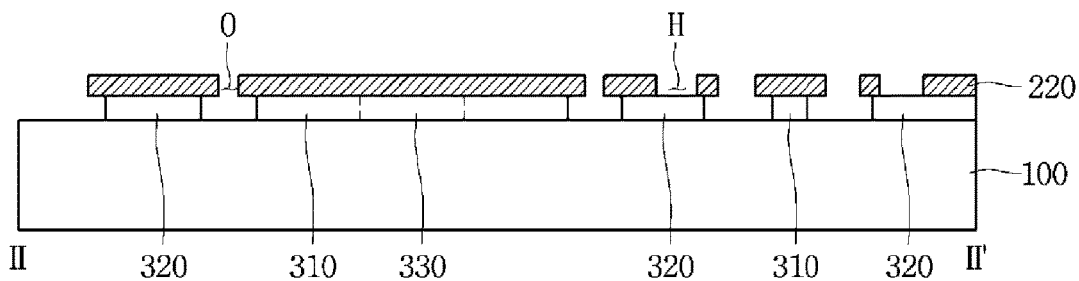
Figure 8:
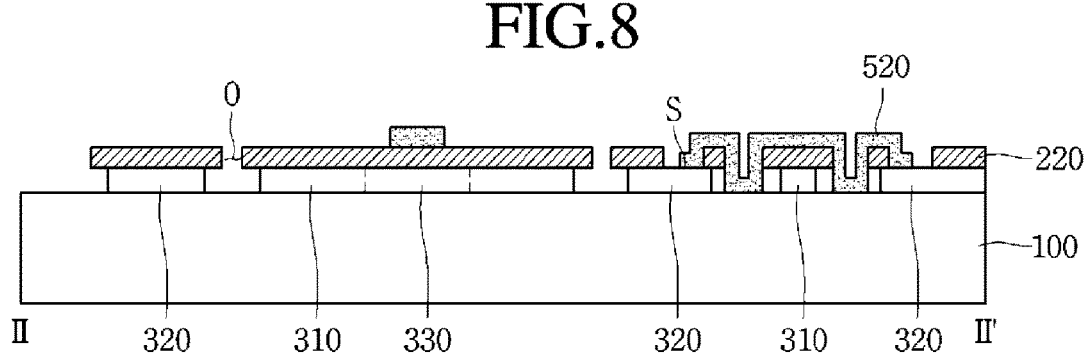

Hereinafter, a touch window according to another embodiment will be described with reference to FIGS. 3 to 8. FIG. 3 is a plan view showing a touch window according to another embodiment. FIGS. 4 to 8 are views illustrating a method of manufacturing a touch window according to another embodiment. In the following description, the parts similar or identical to those of the previously described embodiment will be omitted for the purpose of clear and brief description. The same reference numbers will be assigned to the same elements.

Referring to FIG. 3, the touch window according to another embodiment includes a substrate 100 which is divided into an active area AA and an unactive area UA. A sensing electrode 300 is formed on the active area AA of the substrate 100 and a wire 400 is formed on the unactive area UA of the substrate 100. In addition, although not shown in the drawings, a circuit board connected to the wire 400 may be placed in the unactive area UA.

The sensing electrode 300 may include first and second sensing electrodes 340 and 350 and a bridge electrode 520. The first and second sensing electrodes 340 and 350 and the bridge electrode 520 may include the same material or mutually different materials. In addition, the first and second sensing electrodes 340 and 350, and the bridge electrode 520 may be disposed on the same single surface of the substrate 100.

The first and second sensing electrodes 340 and 350 may be disposed on the active area AA to sense a touch. In detail, the first sensing electrode 340 may extend in a first direction on the active area AA, and the second sensing electrode 350 may be extend in a second direction different from the first direction. In this case, the first direction may be perpendicular to the second direction.

The first sensing electrode 340 may include a plurality of first electrode parts 310 and connection parts 330. The first electrode parts 310 may extend in the first direction. In this case, the first electrode parts 310 may be electrically connected to each other through the connection parts 330. The first electrode parts 310 and the connection parts 330 may be formed integrally with each other.

The second sensing electrode 350 may include a plurality of second electrode parts 320. The second electrode parts 320 may extend in the second direction. The second electrode parts 320 may be connected to each other through the bridge electrode 520.

Although the first and second electrode parts 310 and 320 disposed in a rhombus shape, respectively, are depicted in the drawings, the embodiment is not limited thereto and the first electrode parts 310 may be formed in various shapes such as a bar shape, a polygonal shape including a triangular shape and a rectangular shape, a circular shape, a linear shape, an H-shape or an elliptical shape.

The bridge electrode 520 is disposed on the insulating layer 220. The insulating layer 220 is formed to expose the second electrode parts 320 of the second sensing electrode 350. The bridge electrode 520 may be connected to the second electrode part 320 of the second sensing electrode 350 exposed through the insulating layer 220. That is, the bridge electrode 520 may be disposed to allow the second electrode parts 320 spaced apart from each other to be connected to each other in the second direction.

The insulating layer 220 may be disposed on top surfaces of the first electrode part 310 and the connection part 330 of the first sensing electrode 340, and may be formed to expose the second electrode part 320 of the second sensing electrode 350. In detail, the insulating layer 220 may be formed to make contact with the top surfaces of the first electrode part 310 and the connection part 330 and to expose a part of the top surface of the second electrode part 320.

The insulating layer 220 may include an open part O formed in the area corresponding to the second electrode part 320 in the active area AA. The open part O of the second electrode part 320 may include a contact hole H through which a contact area S of the second sensing electrode 350 is exposed. In this case, the insulating layer 220 may have a shape the same as the shape of the first electrode part 310 and the connection part 330 of the sensing electrode 340 and the shape of the second electrode part 320 of the second sensing electrode 350, so that the insulating layer 220 may overlap with the first electrode part 310 and the connection part 330 of the sensing electrode 340 and the second electrode part 320 of the second sensing electrode 350 in the active area AA.

In addition, the insulating layer 220 and the wire 400 may be formed in the same shape to overlap each other in the unactive area UA. The wire 400 includes a first wire 410 connected to the first sensing electrode 340 and a second wire 420 connected to the second sensing electrode 350. The insulating layer 220 and the first and second wires 410 and 420 may be formed in the same shape to overlap each other in the unactive area UA.

In the active area AA, an end of the insulating layer 220 may be disposed to be spaced apart from one end of the first or second sensing electrode 340 or 350. In this case, one end of the first or second sensing electrode 340 or 350 may be formed inside an end of the insulating layer 220. That is, the insulating layer 220, which overlaps the first or second sensing electrode 340 or 350, may be formed to have a width larger than that of the first or second sensing electrode 340 or 350.

In the unactive area UA, an end of the insulating layer 220 may be disposed to be spaced apart from one end of the first or second wire 410 or 420. In this case, one end of the first or second wire 410 or 420 may be formed inside an end of the insulating layer 220. That is, the insulating layer 220, which overlaps the first or second wire 410 or 420, may be formed to have a width larger than that of the first or second wire 410 or 420.

In this case, the insulating layer 220 may be formed to make direct contact only with the top surfaces of the first and second sensing electrodes 340 and 350. In addition, the insulating layer 220 may be formed to make direct contact only with the top surfaces of the first and second wires 410 and 420. That is, the side surfaces of the first and second sensing electrodes 340 and 350 and the first and second wires 410 and 420 may be formed not to make contact with the insulating layer 220.

Hereinafter, a method of manufacturing a touch window according to still another embodiment will be described as follows: Referring to FIGS. 4 to 8, the touch window is formed by sequentially laminating an electrode material layer 301 and an insulating material layer 201 on the substrate 100.

Next, the insulating material layer 201 is etched to form a first insulating material pattern 202 in an area in which the first sensing electrode and the first wire are formed later and to form a second insulating material pattern 203 in an area in which the second sensing electrode and the second wire are formed later. That is, the first and second insulating material patterns 202 and 203 are formed in shapes corresponding to those of the first and second sensing electrodes and the first and second wires to be formed later.

The second insulating material pattern 203 may be divided into a high step-difference region and a low step-difference region. The low step-difference region may be a region in which the contact hole H of the insulating layer is to be formed. The first insulating material pattern 202 may be formed at a height equal to a pattern height of the pattern in the high step-difference region of the second insulating material pattern 203.

For example, the insulating material layer 201 may be etched through a single mask process by using a half-tone mask including a permeable part, a semi-permeable part and an impermeable part. However, the embodiment is not limited thereto, and various methods may be adopted if the methods may form the first insulating material pattern 202 and the second insulating material pattern 203 divided into the high step-difference region and the low step-difference region.

The electrode material layer 301 is etched by using the first and second insulating material patterns 202 and 203 as masks. The first and second sensing electrodes 340 and 350 are formed on the active area AA by etching the electrode material layer 301. That is, the first electrode part 310 of the first sensing electrode 340, the connection part 330 and the second electrode part 320 of the second sensing electrode 350 may be formed. In addition, the electrode material layer 301 is etched to form the first and second wires 410 and 420 on the unactive area UA.

For example, the electrode material layer 301 may be etched through a wet etching scheme. In this case, as isotropic etch is performed, the etch proceeds in vertical and horizontal directions so that an under-cut phenomenon occurs.

For this reason, the ends of the first and second insulating material patterns 202 and 203 are formed to be spaced apart from the ends of the first and second sensing electrodes 340 and 350 and the first and second wires 410 and 420. That is, due to the under-cut phenomenon, the ends of the first and second sensing electrodes 340 and 350 and the first and second wires 410 and 420 are formed inside the ends of the first and second insulating material patterns 202 and 203. Thus, the width W1 of the first and second insulating material patterns 202 and 203 is larger than the width W2 of the first and second wires 410 and 420.

Thereafter, the insulating layer 220 is formed by ashing or etching the first and second insulating material patterns 202 and 203. In this case, the pattern in the low step-difference region of the second insulating material pattern 203 may be removed so that the contact hole H is formed to expose the second electrode part 320 of the second sensing electrode 350 and a part of the second wire 420. In addition, the pattern in the high step-difference region of the second insulating material pattern 203 and the first insulating material pattern 202 may remain to form the insulating layer 220.

That is, except for the fact that the open part O is formed, the insulating layer 220 is formed in the same shape as the first and second insulating material patterns 202 and 203. For this reason, the insulating layer 220, the first and second sensing electrodes 340 and 350, and the first and second wires 410 and 420 are formed in the same shape to overlap each other. In addition, the insulating layer 220 is formed to make contact only with the top surfaces of the first and second sensing electrodes 340 and 350, and the first and second wires 410 and 420.

In addition, ends of the first and second sensing electrodes 340 and 350 and the first and second wires 410 and 420 may be disposed inside an end of the insulating layer 220. Thus, the insulating layer 220 is formed to have a width larger than those of the first and second sensing electrodes 340 and 350 and the first and second wires 410 and 420.

Thereafter, the bridge electrode 520 is formed on the insulating layer 220. The bridge electrode 520 may include a material equal to or different from that of the first and second sensing electrode 340 and 350. The bridge electrode 520 may be electrically connected to the second electrode part 320 through the contact hole of the insulating layer 220 through which the second electrode part 320 is exposed.

That is, the bridge electrodes 520 are spaced part from each other, so that the second electrode parts 320 extending in the second direction are connected to each other. In addition, the bridge electrode 520 may allow the second sensing electrode 350 to connect with the second wire 420.

For example, the bridge electrode 520 may be disposed in a bar shape. In detail, the bridge electrodes 520 may be disposed in a bar shape to be spaced apart from each other on the active area AA by a regular interval. However, the shape of the bridge electrode 520 is not limited to the above and various shapes can be adopted if the second electrode parts 320 adjacent to each other can be connected to each other in the second direction.

In this case, since the ends of the first electrode part 310 of the first sensing electrode 340 and the connection part 330 are disposed inside the end of the insulation layer 220, the first sensing electrode 340 and the bridge electrode 520 may be formed not to make contact with each other. That is, even when the insulating layer 220 does not make contact with the side surface of the first sensing electrode 340, the side surface of the first sensing electrode 340 is neither connected to nor makes contact with the bridge electrode 520.

However, the method of manufacturing a touch window according to still another embodiment is not limited to the above. Various methods may be adopted if the methods may form the insulating layer having the same shape as those of the first and second sensing electrodes to overlap each other.

When the sensing electrode and the wire are formed on the substrate and then, the insulating layer is formed, a misalignment may occur in forming the open part O for exposing the second electrode part of the second sensing electrode. For this reason, a tolerance for the alignment is required. In addition, even though there exists a tolerance, the alignment may be twisted, so that the second sensing electrode may not be connected to the bridge electrode or a connection error may occur between the first and second sensing electrodes.

According to the touch window of still another embodiment, after the pattern of the insulating layer 220 is formed, the pattern of the sensing electrode 300 is formed by using the pattern of the insulating layer 200 as a mask, so that the touch window may be formed without any tolerance for forming the open part O through which the second electrode part 320 is exposed to the insulating layer 220. In addition, the open part O formed in the insulating layer 220 allows the top surface of the second electrode part 320 to be always exposed.

In addition, when the pattern of the sensing electrode is first formed, a mask for forming the pattern of the sensing electrode and a mask for forming the open part O in the insulating layer are required. However, according to the touch window of still another embodiment, since a mask is required only when the pattern of the insulating layer 220 is formed, the process may be simplified and the cost may be reduced.

Although not shown in the drawings, the touch window according to the embodiment may further include a cover substrate disposed on the substrate 100 on which the sensing electrode 300 and the wire 400 are formed. That is, the cover substrate may be disposed on the substrate 100 on which the first and second sensing electrodes 340 and 350, the insulating layer 210 and the bridge electrode 510 are formed.

A transparent adhesive layer may be formed between the substrate 100 and the cover substrate. For example, the transparent adhesive layer may include optically clear adhesive (OCA) or optically clear resin (OCR).

Figure 9:
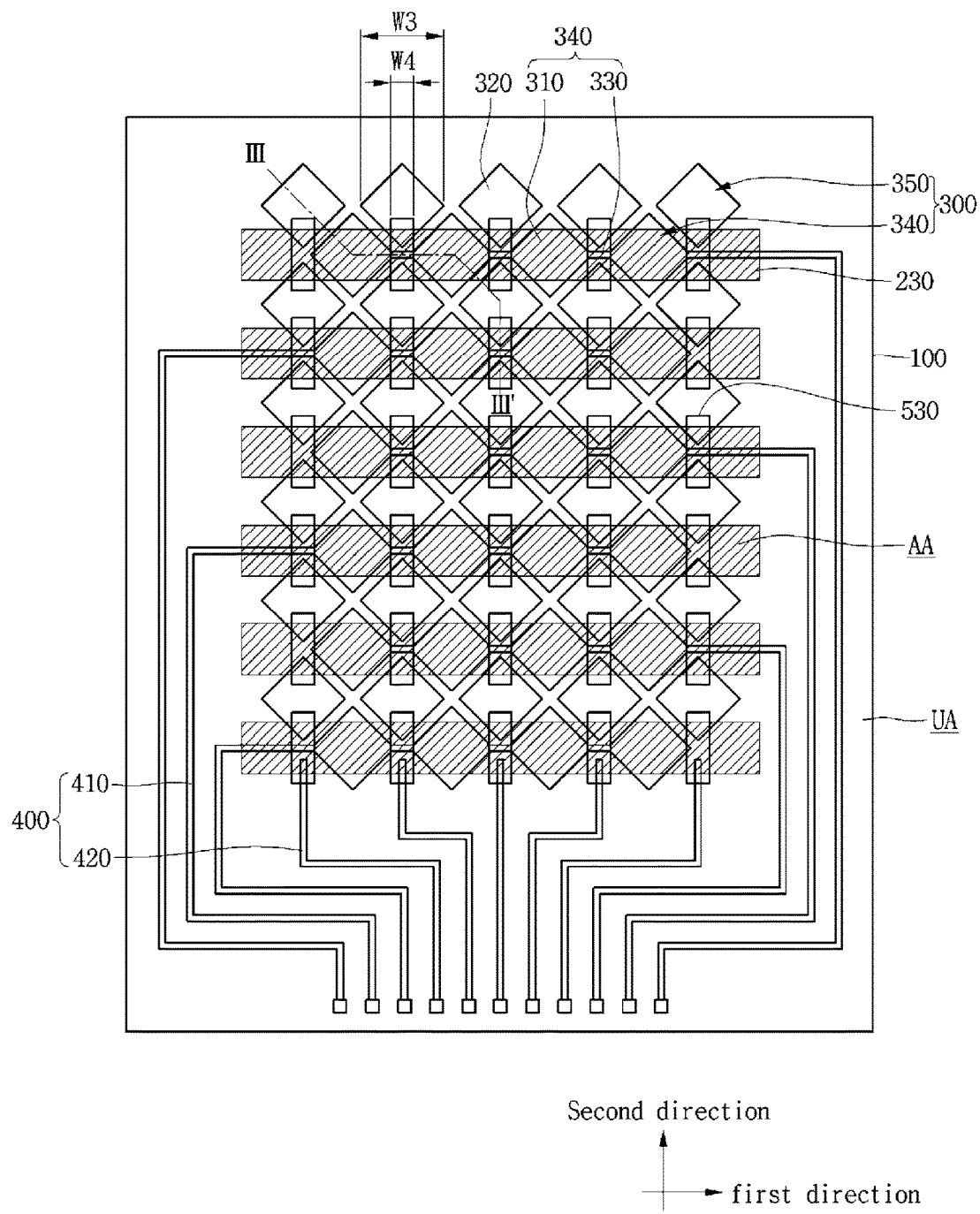
FIG. 9 is a plan view showing a touch window according to a fourth embodiment.
Figure 10:
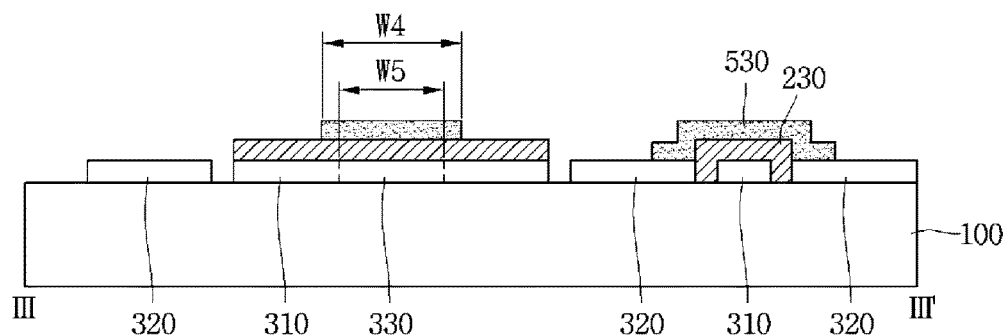
FIG. 10 is a sectional view taken along line III-III' of FIG. 9.

Hereinafter, a touch window according to still another embodiment will be described with reference to FIGS. 9 and 10. FIG. 9 is a plan view showing a touch window according to still another embodiment. FIG. 10 is a sectional view taken along line III-III' of FIG. 9. In the following description, the parts similar or identical to those of the previously described embodiment will be omitted for the purpose of clear and brief description. The same reference numbers will be assigned to the same elements.

Referring to FIGS. 9 and 10, the touch window according to another embodiment includes a substrate 100 which is divided into an active area AA and an unactive area UA. A sensing electrode 300 is formed on the active area AA of the substrate 100 and a wire 400 is formed on the unactive area UA of the substrate 100. In addition, although not shown in the drawings, a circuit board connected to the wire 400 may be placed in the unactive area UA.

The sensing electrode 300 may include first and second sensing electrodes 340 and 350, and a bridge electrode 530. In addition, the first and second sensing electrodes 340 and 350, and the bridge electrode 530 may be disposed on the same single surface of the substrate 100.

The first sensing electrode 340 may extend on the active area AA in the first direction, and the second sensing electrode 350 may extend in the second direction different from the first direction. In this case, the first direction may be perpendicular to the second direction.

The first sensing electrode 340 may include a plurality of first electrode parts 310 and connection parts 330. The first electrode parts 310 may extend in the first direction. In this case, the first electrode parts 310 may be electrically connected to each other through the connection parts 330. The first electrode parts 310 and the connection parts 330 may be formed integrally with each other.

The second sensing electrode 350 may include a plurality of second electrode parts 320. The second electrode parts 320 may extend in the second direction. The second electrode parts 320 may be connected to each other through the bridge electrode 530.

Although the first and second electrode parts 310 and 320 disposed in a rhombus shape, respectively, are depicted in the drawings, the embodiment is not limited thereto and the first electrode parts 310 may be formed in various shapes such as a bar shape, a polygonal shape including a triangular shape and a rectangular shape, a circular shape, a linear shape, an H-shape or an elliptical shape.

The bridge electrode 530 is disposed on the insulating layer 230. The insulating layer 230 is formed to expose the second electrode parts 320 of the second sensing electrode 350. The bridge electrode 530 may be connected to the second electrode part 320 of the second sensing electrode 350 exposed through the insulating layer 230. That is, the bridge electrode 530 may be disposed to allow the second electrode parts 320 spaced apart from each other to be connected to each other in the second direction.

The bridge electrode 530 may have a size of 200 posed to allow the second electrode parts 320 spaced apa width W4 of the bridge electrode 530 may be larger than the width W5 of the connection part 330 of the first sensing electrode 340. That is, the bridge electrode 530 may be formed to have a great size so that the alignment tolerance is secured. In this case, in the first direction, the width W4 of the bridge electrode 530 may be equal to or less than the width W3 of the second electrode part 320 of the second sensing electrode 350. For this reason, the bridge electrode 530 may be connected to the second electrode part 320 adjacent in the second direction and may not be connected to the second electrode part 320 adjacent in the first direction.

For example, the bridge electrode 530 may be disposed in a bar shape. In detail, the bridge electrodes 530 may be disposed in a bar shape to be spaced apart from each other on the active area AA by a constant interval.

In addition, the plurality of bridge electrodes 530 extending in the second direction and spaced apart from each other are depicted in the drawings, but the embodiment is not limited thereto. That is, the bridge electrodes 530 may be formed as a single pattern extending in the second direction.

In addition, the bridge electrode 530 may be formed in the same shape as the second electrode part 320 in the area in which the bridge electrode 530 overlaps the second electrode part 320. In addition, the bridge electrode 530 may include an electrode part and a connection part and extend in the second direction.

The insulating layer 230 may be disposed on top surfaces of the first electrode part 310 and the connection part 330 of the first sensing electrode 340, and may be formed to expose the second electrode part 320 of the second sensing electrode 350. In detail, the insulating layer 230 may be formed to make contact with the top surfaces of the first electrode part 310 and the connection part 330 and to expose a part of the top surface of the second electrode part 320. In this case, the insulating layer 320 may be disposed to extend in the first direction on the first electrode part 310 and the connection part 330.

That is, without forming any additional open parts O, a plurality of insulating layers 230 may be formed along the first sensing electrode 340. In this case, in the second direction, a width of the insulating layer 230 is less than that of the bridge electrode 530. Thus, since the bridge electrode 530 is formed to be longer than the insulating layer 230 in the second direction, the bridge electrode 530 may come into contact with the second electrode part 320 of the second sensing electrode 350.

In addition, the insulating layer 230 is disposed to extend to the top surface of the first electrode part 310 of the first sensing electrode 340 beyond the top surface of the connection part 330 of the first sensing electrode 340. Thus, the tolerance can be ensured for an area to form the first sensing electrode 340.

Although not shown in the drawings, the touch window according to still another embodiment may further include a cover substrate disposed on the substrate 100 on which the sensing electrode 300 and the wire 400 are formed. That is, the cover substrate may be disposed on the substrate 100 on which the first and second sensing electrodes 340 and 350, the insulating layer 230 and the bridge electrode 530 are formed.

A transparent adhesive layer may be formed between the substrate 100 and the cover substrate. For example, the transparent adhesive layer may include optically clear adhesive (OCA) or optically clear resin (OCR).

Figure 11:
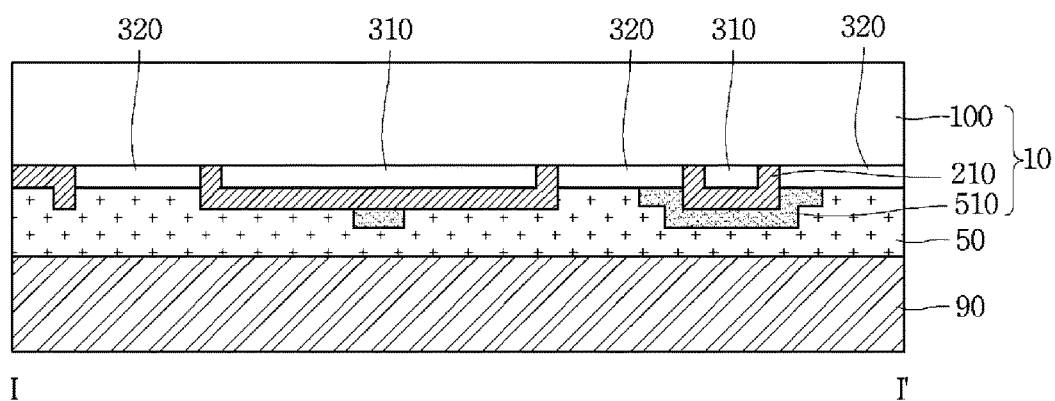
FIGS. 11 and 12 are sectional views showing a touch device including a touch window according to an embodiment.
Figure 12:
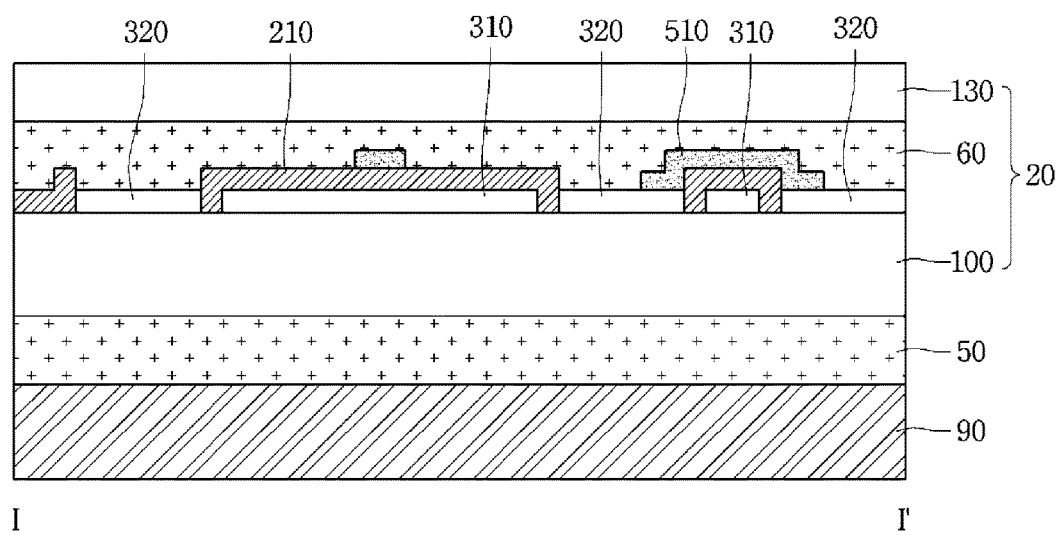

Hereinafter, a touch device including a touch window according to an embodiment will be described with reference to FIGS. 11 and 12. FIGS. 11 and 12 are sectional views showing a touch device including a touch window according to an embodiment. In the following description, the parts similar or identical to those of the previously described embodiment will be omitted for the purpose of clear and brief description. The same reference numbers will be assigned to the same elements.

Referring to FIGS. 11 and 12, a touch device including a touch window according to an embodiment includes a display panel 90 and a touch window 10 or 20. The touch window 10 or 20 is equal to the touch window according to the embodiments described above.

That is, although the touch window 10 or 20 according to the embodiment is depicted in the drawings, the touch window 10 or 20 may be equal to the touch window according to the previous embodiments.

The touch device may include an active area through which light is permeable and an unactive area through which light is impermeable. An adhesive layer 50 is interposed between the display panel 90 and the touch window. The adhesive layer 50 may be formed on parts of the active and unactive areas. the transparent adhesive layer may include optically clear adhesive (OCA) or optically clear resin (OCR) and may allow the display panel 90 to adhere to the touch window 10 or 20.

Referring to FIG. 11, a substrate 100, on which the first and second electrode parts 310 and 320, the insulating layer 210 and the bridge electrode 510 are formed, may serve as a cover substrate of the touch window 10. In this case, the adhesive layer 50 may be formed to make contact with the sensing electrode formed on the substrate 100.

Referring to FIG. 12, the touch window 20 may include a cover substrate 150 separated. In this case, a transparent adhesive layer 60 may be interposed between the cover substrate 150 and the substrate 100. In addition, the adhesive layer 50 may be formed to make contact with a rear surface of the substrate 100.

The display panel 90 may include an LCD (Liquid Crystal Display) panel and a backlight unit for providing a surface light source to the LCD panel. The LCD panel may be integrally coupled with the backlight unit by a set cover. For example, the set cover may include a lower cover, a support main and an upper cover. In this case, the lower cover, the support main and the upper cover may be integrally assembled with each other. A cover attachment film is attached onto the upper cover and the touch window so that the touch window may be formed integrally with the upper cover.

The LCD panel may be formed by combining an upper substrate including R (Red), G (Green) and B (Blue) color filter layers and a lower substrate including TFTs (Thin Film Transistors) and pixel electrodes while a liquid crystal layer is interposed between the upper and lower substrates.

In addition, the liquid crystal display panel may have a color filter on transistor (COT) structure in which a color filter and a black matrix are formed on the lower substrate. A TFT transistor may be formed on the lower substrate, a protective layer may be formed on the TFT transistor and a color filter layer may be formed on the protective layer. In addition, the lower substrate is provided with a pixel electrode making contact with the TFT transistor. In this case, to improve an aperture ratio and simplify a mask process, the black matrix may be omitted, and a common electrode may perform a function of the black matrix together with the inherent function thereof.

The backlight unit may include a light emitting diode package (hereinafter, referred to as a 'light emitting package') having R, G and B LEDs or a white (W) LEDs, a printed circuit board on which a plurality of power source patterns for providing power to the light emitting package are formed, a light guide plate for converting a light source provided from the light emitting package into a surface light source, a reflective plate disposed on a rear surface of the light guide plate to improve luminous efficiency, and an optical sheet disposed at a front (upper side) of the light guide plate to concentrate and diffuse the incident light thereupon.

The display panel 90 may include an organic light emitting device. The organic light emitting device (OLED) includes a self light-emitting device which does not require any additional light source. A thin film transistor is formed on the organic light emitting device, and an organic light-emitting device making contact with the thin film transistor is formed on the OLED. The OLED may include an anode, a cathode and an organic light-emitting layer formed between the anode and the cathode. In addition, the display panel 90 may further include an encapsulation substrate for encapsulation on the OLED.

In addition, the display panel 90 is not limited to the above, and may be a display panel 90 constituting an EPD (Electrophoretic Display or Electric Paper Display), a PDP (Plasma Display Panel device), an FED (Field Emission Display device), an ELD (Electro luminescence Display Device) or an EWD (Electro-Wetting Display). Hereinafter, a touch window according to another embodiment will be described with reference to FIGS. 13 to 17. In the following description, the parts similar or identical to those of the previously described embodiment will be omitted for the purpose of clear and brief description. The same reference numbers will be assigned to the same elements.

Figure 13:
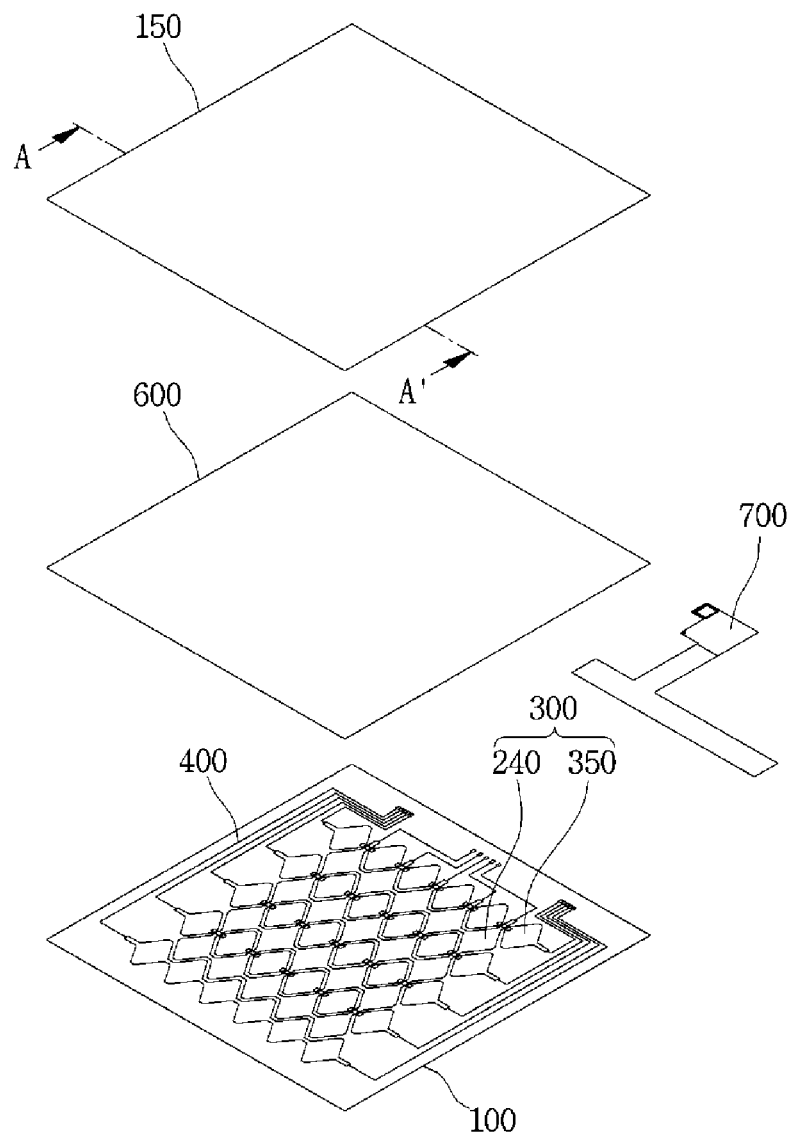
FIG. 13 is an exploded sectional view of a touch window according to another embodiment.
Figure 14:
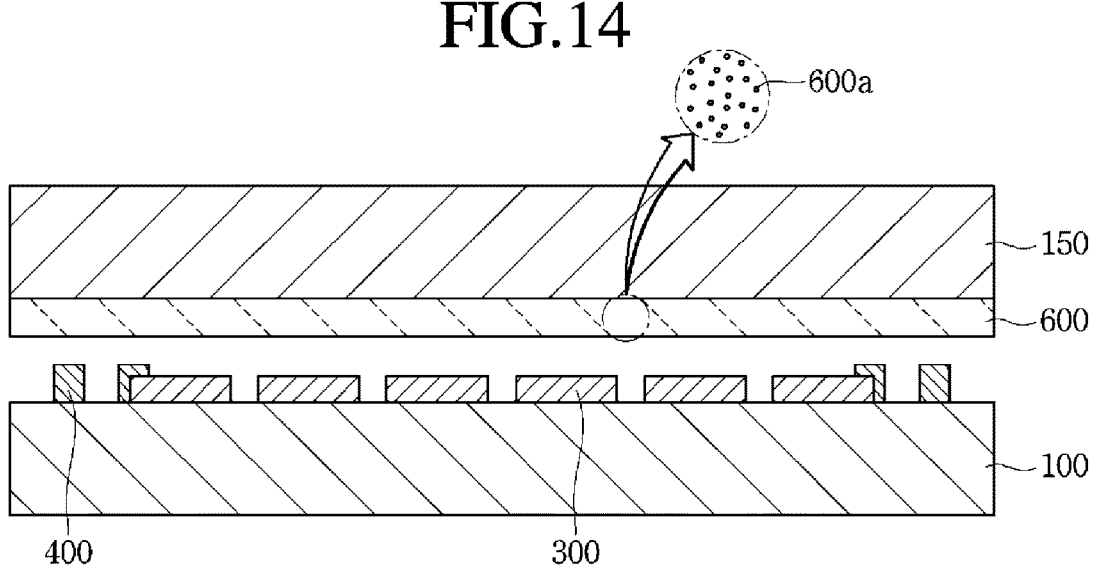
FIG. 14 is a sectional view taken along line A-A' of FIG. 13.

Referring to FIGS. 13 and 14, a touch window according to still another embodiment may include a substrate 100, a sensing electrode 300, a wire 400, a blocking layer 600 and a printed circuit board 700.

In addition, the touch window may include a cover substrate 150. The cover substrate 150 may be flexible or rigid. For example, the cover substrate 150 may include glass or plastic. In detail, the cover substrate 150 may include chemically tempered/semi-tempered glass, such as soda lime glass or aluminosilicate glass, reinforced/flexible plastic, such as polyimide (PI), polyethylene terephthalate (PET), propylene glycol (PPG), or poly carbonate (PC), or sapphire. In addition, the cover substrate 150 may be bent to have a partial curved surface. That is, the cover substrate 150 may be bent to have a partial flat surface and a partial curved surface. In detail, an end of the cover substrate 150 may be bent to have a curved surface or may be bent or flexed to have a surface including a random curvature.

In addition, the cover substrate 150 may include a flexible substrate having a flexible property.

Further, the cover substrate 150 may include a curved or bended substrate. That is, a touch window including the cover substrate 150 may be formed to have a flexible, curved or bended property. For this reason, the touch window according to the embodiment may be easily portable and may be variously changed in design.

However, the embodiment is not limited to the above. The cover substrate 150 may be formed of various materials capable of supporting the sensing electrode 300, the wire 400 and a printed circuit board which are formed on the cover substrate 150. A touch may be performed on the top surface of the cover substrate 150.

The substrate 100 may be disposed below the cover substrate 150.

In addition, the sensing electrode 300 may be disposed on the substrate 100.

According to still another embodiment, the substrate and the sensing electrode of one of the above described embodiments may be applied as the substrate 100 and the sensing electrode 300.

In particular, according to still another embodiment, the blocking layer 600 may be interposed between the cover substrate 150 and the substrate 100. That is, the blocking layer 600 may block a part of light incident upon the touch window. In detail, the blocking layer 600 may block the light having a short wavelength. In more detail, the blocking layer 600 may block the light having a wavelength of 300 nm to 800 nm. In detail, the blocking layer 600 may absorb the light having a wavelength of 350 nm to 780 nm. Preferably, the blocking layer 600 may absorb the light having a wavelength of 380 nm to 700 nm.

The blocking layer 600 may include blocking particles 600a. The blocking particles 600a may include oxide. In detail, the blocking particles 600a may include one of titanium oxide and zinc oxide.

The blocking particles 600a may be distributed into the base. The base may include thermoplastic resin.

The titanium oxide may absorb light to block light. The titanium oxide may absorb the light having a wavelength of 300 nm to 800 nm. In detail, the titanium oxide may absorb the light having a wavelength of 350 nm to 780 nm. Preferably, the titanium oxide may absorb the light having a wavelength of 380 nm to 700 nm.

The zinc oxide may scatter the light having of 300 nm to 800 nm. In detail, the zinc oxide may absorb the light having a wavelength of 350 nm to 780 nm. Preferably, the zinc oxide may absorb the light having a wavelength of 380 nm to 700 nm.

As described above, the blocking layer 600 blocks the incident light having a short wavelength, so that the visibility of the sensing electrode 300 may be improved.

Figure 15:
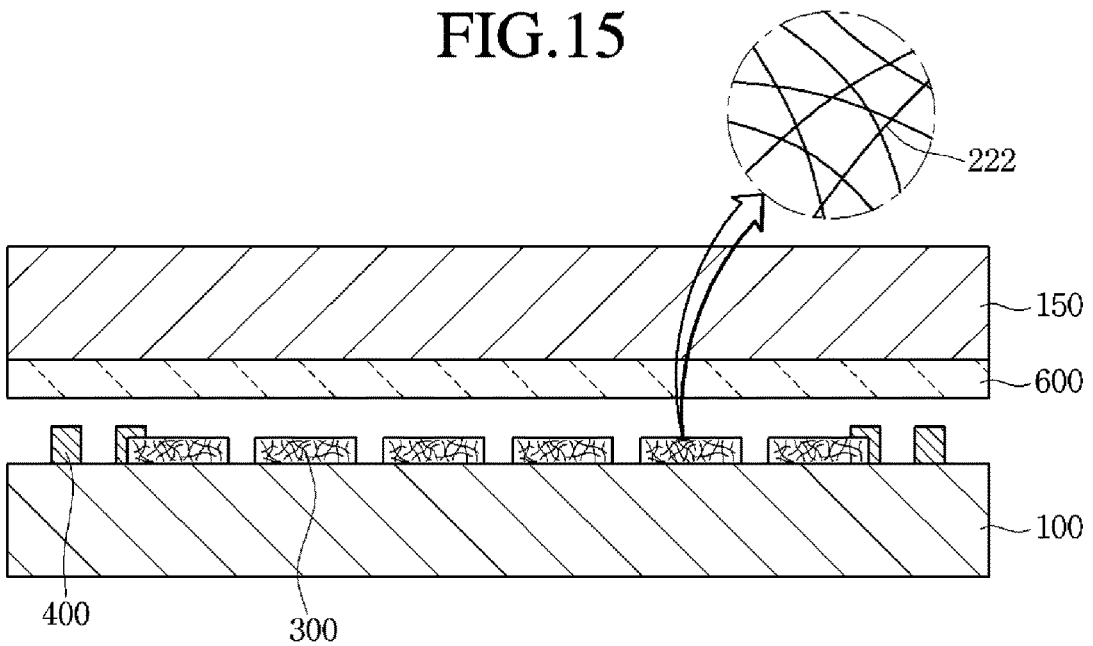
FIGS. 15 to 17 are sectional views taken along line A-A' according to still another embodiment.

Meanwhile, as shown in FIG. 15, the sensing electrode 300 may include an interconnecting structure 222. The interconnecting structure 222 may include a microstructure having a diameter in the range of 5 nm to 300 nm. In detail, the interconnecting structure 222 may include a microstructure having a diameter in the range of 10 nm to 200 nm. Preferably, as one example, the interconnecting structure 222 may include a microstructure having a diameter in the range of 20 nm to 100 nm. The sensing electrode 300 may include a nanowire. The sensing electrode 300 may include a metallic nanowire.

Figure 16:
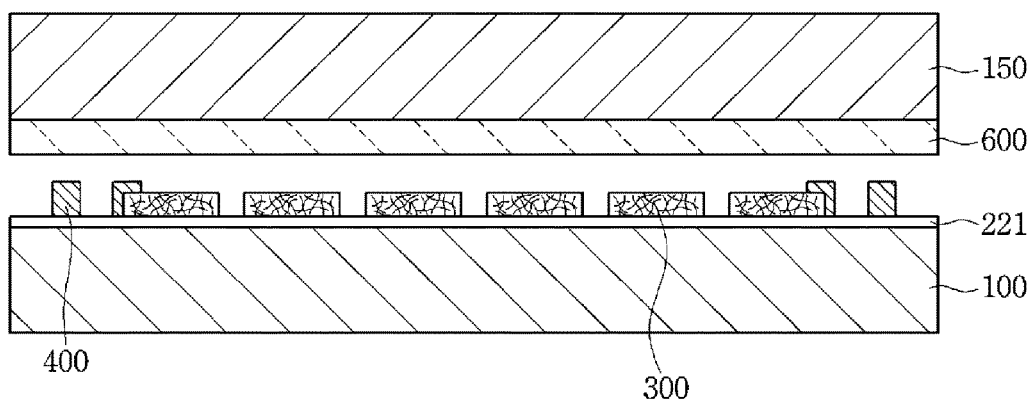

Referring to FIG. 16, the sensing electrode 300 may include a base material 221 and an interconnecting structure 222. The base material 221 includes a photosensitive material. Since the base material 221 include the photosensitive material, the sensing electrode 300 may be formed through exposure and development processes.

The sensing electrode 300 may include photosensitive nanowire film. The sensing electrode 300 may include the photosensitive nanowire film, so that the thickness of the sensing electrode 300 may be reduced. In other words, the sensing electrode 300 includes the nanowire, and the entire thickness of the sensing electrode 300 may be reduced. Conventionally, when the sensing electrode 300 includes the nanowire, an overcoating layer must be additionally formed to prevent the nanowire from being oxidized, so that the fabricating process may be complicated and the thickness of the touch window may be increased. However, according to the embodiment, the nanowire is provided in the photosensitive material so that the nanowire may be prevented from being oxidized without any overcoating layers.

Specifically, the interconnecting structure has reflectance of about 30% to about 80% in the wavelength band of 300 nm to 800 nm, so that the interconnecting structure allows the visibility to deteriorate. In detail, the interconnecting structure may have reflectance of about 35% to about 75% in the wavelength band of 350 nm to 780 nm. In more detail, the interconnecting structure may have reflectance of about 37% to about 70% in the wavelength band of 380 nm to 700 nm. Thus, the light having a wavelength of 300 nm to 800 nm is blocked through the blocking layer 600, so that the reflectance may be reduced.

In addition, even when the sensing electrode 300 includes a metal weak in light reflection, the light reflectance may be reduced through the blocking layer 600.

Next, the wire 400 is formed on the substrate 100. An electrical signal may be applied to the sensing electrode 300 through the wire 400. The wire 400 may include a material equal or similar to that included in the sensing electrode 300.

Meanwhile, the printed circuit board 700 connected to the wire 400 may be further placed. Various types of printed circuit boards may serve as the printed circuit board 700. For example, a flexible printed circuit board (FPCB) may serve as the printed circuit board 700.

Figure 17:
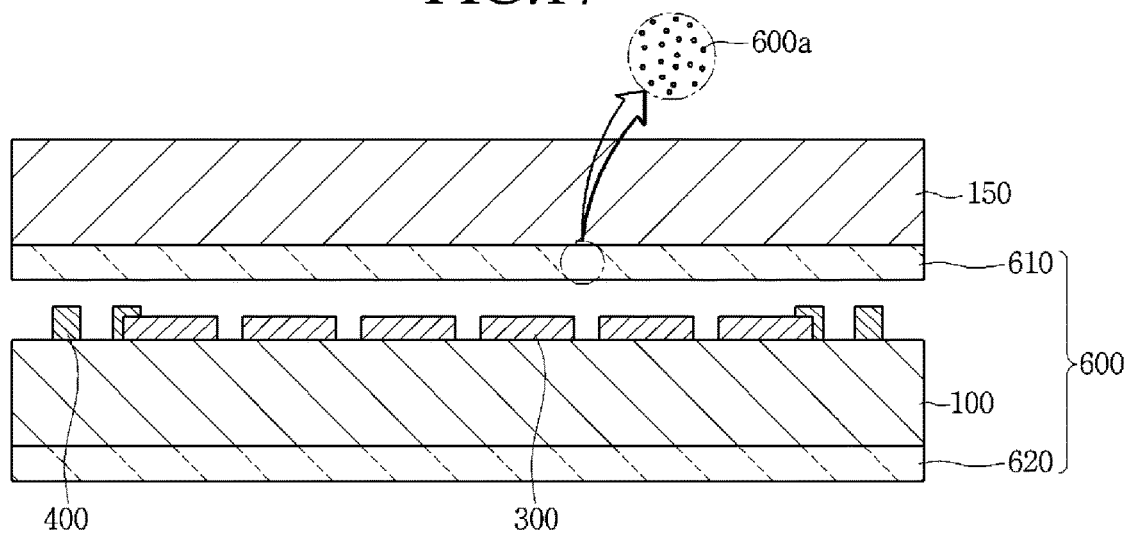

Meanwhile, referring to FIG. 17, the blocking layer 600 may include a first blocking layer 610 disposed on the sensing electrode 300 and a second blocking layer 620 disposed under the sensing electrode 300. That is, the second blocking layer 620 may be disposed below the substrate 100. Thus, the light having a short wavelength and incident from a low portion of the touch window may be prevented from being scattered or reflected.

Figure 18:
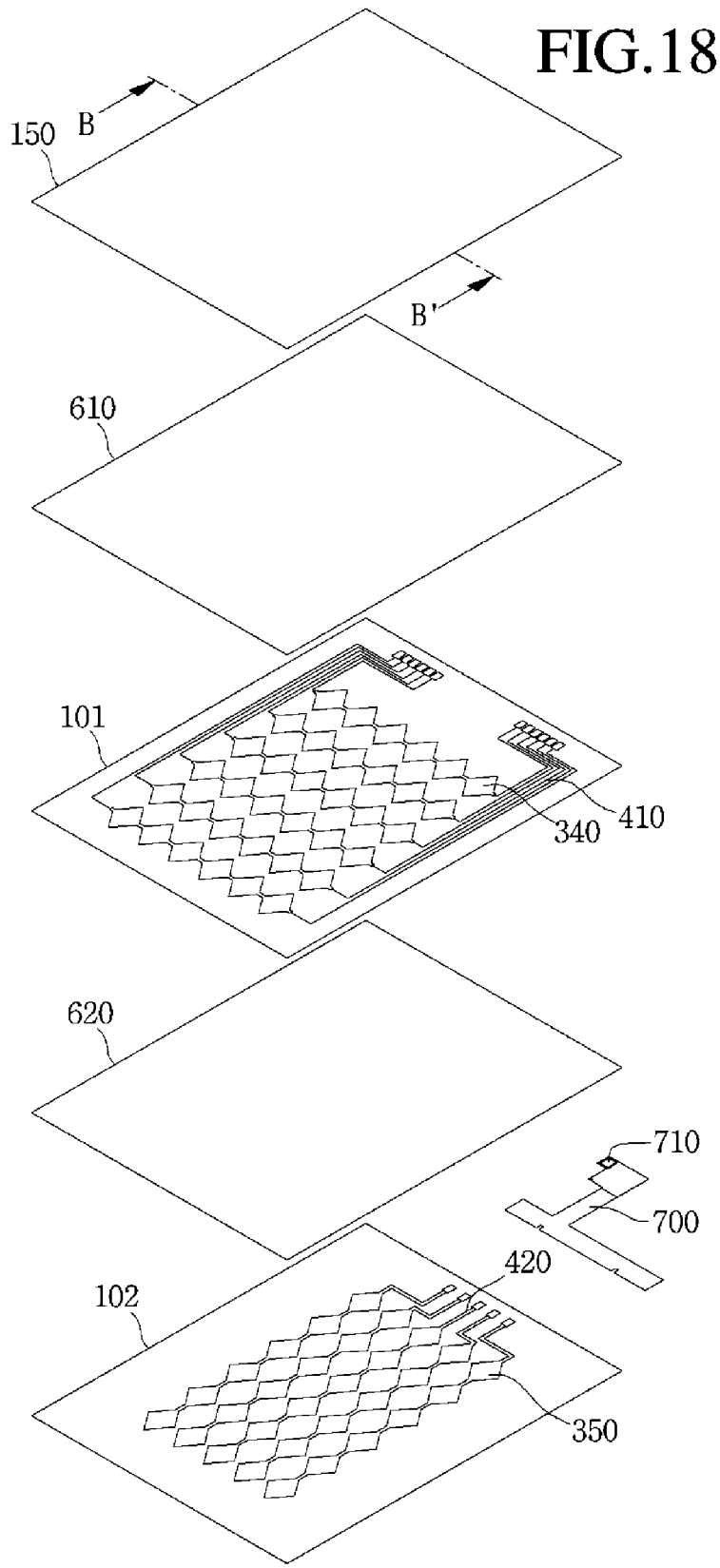
FIG. 18 is an exploded sectional view of a touch window according to still another embodiment.
Figure 19:
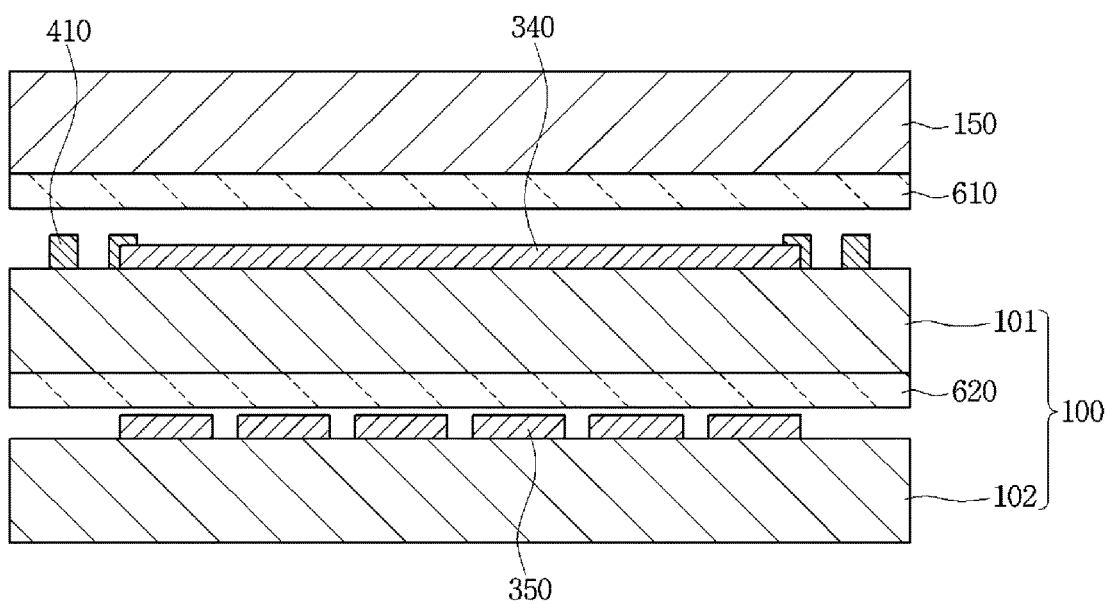
FIG. 19 is a sectional view taken along line B-B' of FIG. 18.

Meanwhile, referring to FIGS. 18 and 19, the substrate 100 of a touch window according to an embodiment may include a first substrate 101 and a second substrate 102 on the first substrate 101. The sensing electrode 300 may include a first sensing electrode 340 extending in the first direction and a second sensing electrode 350 extending in the second direction.

The first sensing electrode 340 may be formed on the first substrate 101 disposed on the cover substrate 150 and the second sensing electrode 350 may be formed on the second substrate 102 disposed on the first substrate 101. Optical clear adhesive (OCA) may be interposed between the cover substrate 150, and the first and second substrates 101 and 102. In addition, the first blocking layer 610 may be disposed on the first substrate 101 and the second blocking layer 620 may be disposed on the second substrate 102.

Figure 20:
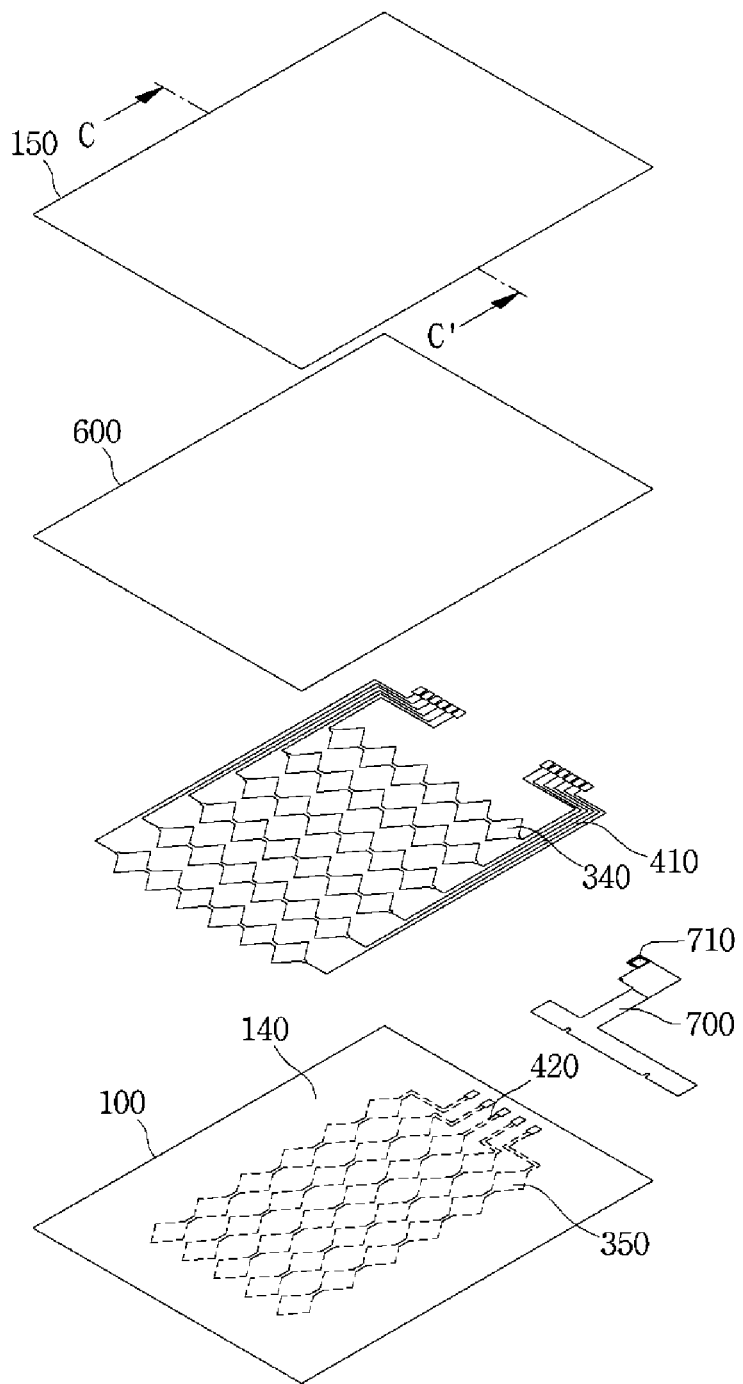
FIG. 20 is an exploded sectional view of a touch window according to still another embodiment.
Figure 21:
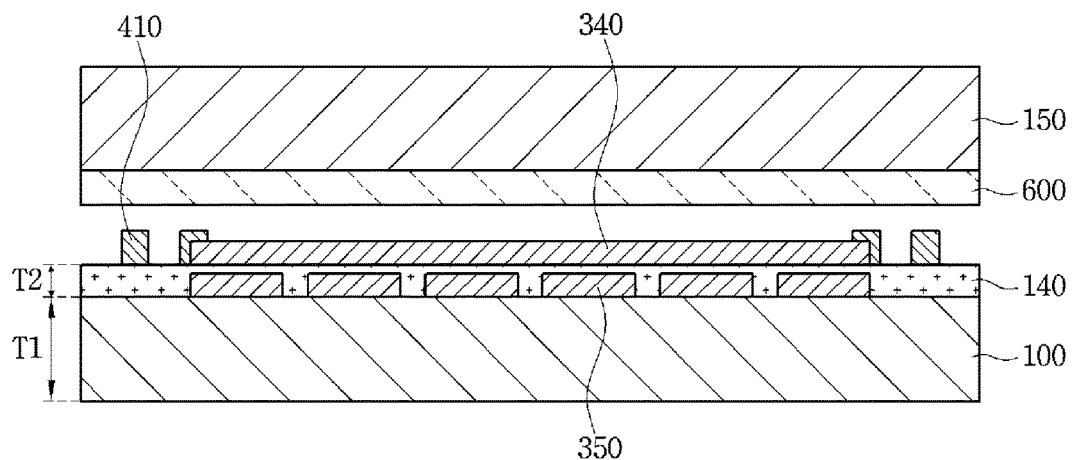
FIG. 21 is a sectional view taken along line C-C' of FIG. 20.

Referring to FIGS. 20 and 21, the intermediate layer 140 may be disposed on the substrate 100. The intermediate layer 140 may be disposed on the second sensing electrode 350. The intermediate layer 140 may support the first sensing electrode 340. At the same time, the intermediate layer 140 may insulate the first and second sensing electrodes 340 and 350 from each other.

The intermediate layer 140 may include a material different from the substrate 100. For example, the intermediate layer 140 may include a dielectric material.

For example, the intermediate layer 140 may include an insulating group including halogen compound of alkali metal or alkali earth metal, such as LiF, KCl, $CaF_2$, or $MgF_2$, or fused silica, such as $SiO_2$, $SiN_x$, etc.; a semiconductor group including InP or InSb; transparent oxide used for semiconductor or dielectric substance including In compound, such as ITO or IZO, mainly used for a transparent electrode, or transparent oxide used for semiconductor or dielectric substance, such as $ZnO_x$, ZnS, ZnSe, $TiO_x$, $WO_x$, $MoO_x$, or $ReO_x$; an organic semiconductor group including $Alq_3$, NPB, TAPC, 2TNATA, CBP or Bphen; and a low-K material such as silsesquioxane or a derivative ((H—$SiO_{3/2})_n$) thereof, methylsilsesquioxane ($CH_3$—$SiO_{3/2})_n$), porous silica or porous silica doped with fluorine or carbon atoms, porous zinc oxide ($ZnO_x$), cyclized-perfluoropolymer (CYTOP) or a mixture thereof. The intermediate layer 140 may have visible ray transmittance of 79% to 99%.

In this case, a thickness of the intermediate layer 140 may be less than a thickness of the cover substrate 100. The thickness T2 of the intermediate layer 140 may be less than a thickness T1 of the substrate 100. The thickness T2 of the intermediate layer 140 may be 0.01 to 0.95 times the thickness T1 of the substrate 100. In detail, the thickness T2 of the intermediate layer 140 may be 0.03 to 0.8 times the thickness T1 of the substrate 100. Preferably, the thickness T2 of the intermediate layer 140 may be 0.05 to 0.5 times the thickness T1 of the substrate 100. For example, when the thickness T1 of the substrate 100 is equal to 0.05 mm, the thickness T2 of the intermediate layer 140 may be equal to 0.005 mm.

The intermediate layer 140 may be directly formed on the top surface of the substrate 100. That is, the intermediate layer 140 may be formed by directly coating a dielectric material on the top surface of the substrate 100. Then, the first sensing electrode 340 may be formed on the intermediate layer 140.

Figure 22:
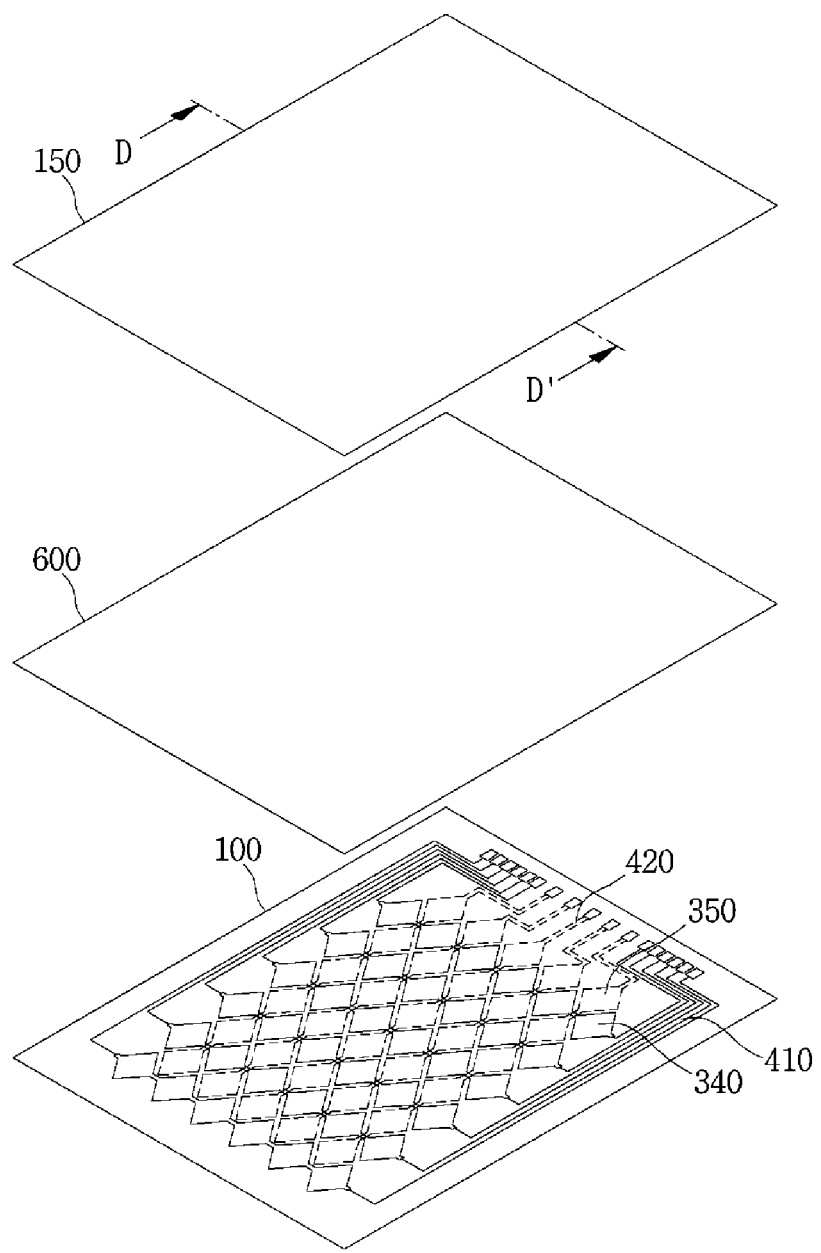
FIG. 22 is an exploded sectional view of a touch window according to still another embodiment.
Figure 23:
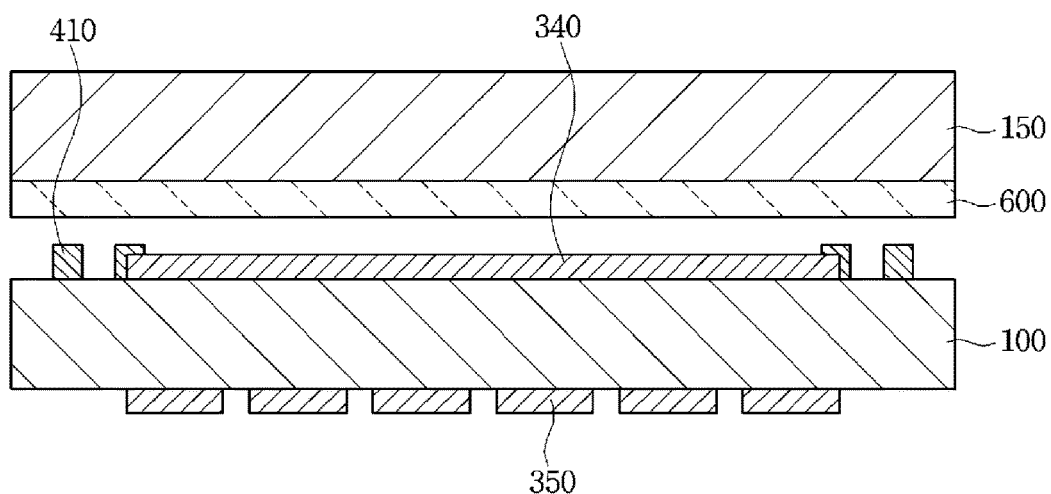
FIG. 23 is a sectional view taken along line D-D' of FIG. 22.

By securing the touch window having a thin thickness through the intermediate layer 140, the transmittance may be improved and the first and second sensing electrodes 340 and 350 may be prevented from being cracked. Thus, the bending property and reliability of the touch window may be improved Meanwhile, referring to FIGS. 22 and 23, the first sensing electrode 340 may be formed on one surface of the substrate 100 disposed on the cover substrate 150, and the second sensing electrode 350 may be formed on an opposite surface of the substrate 100. Thus, the thickness of the touch window may be reduced.

Figure 24:
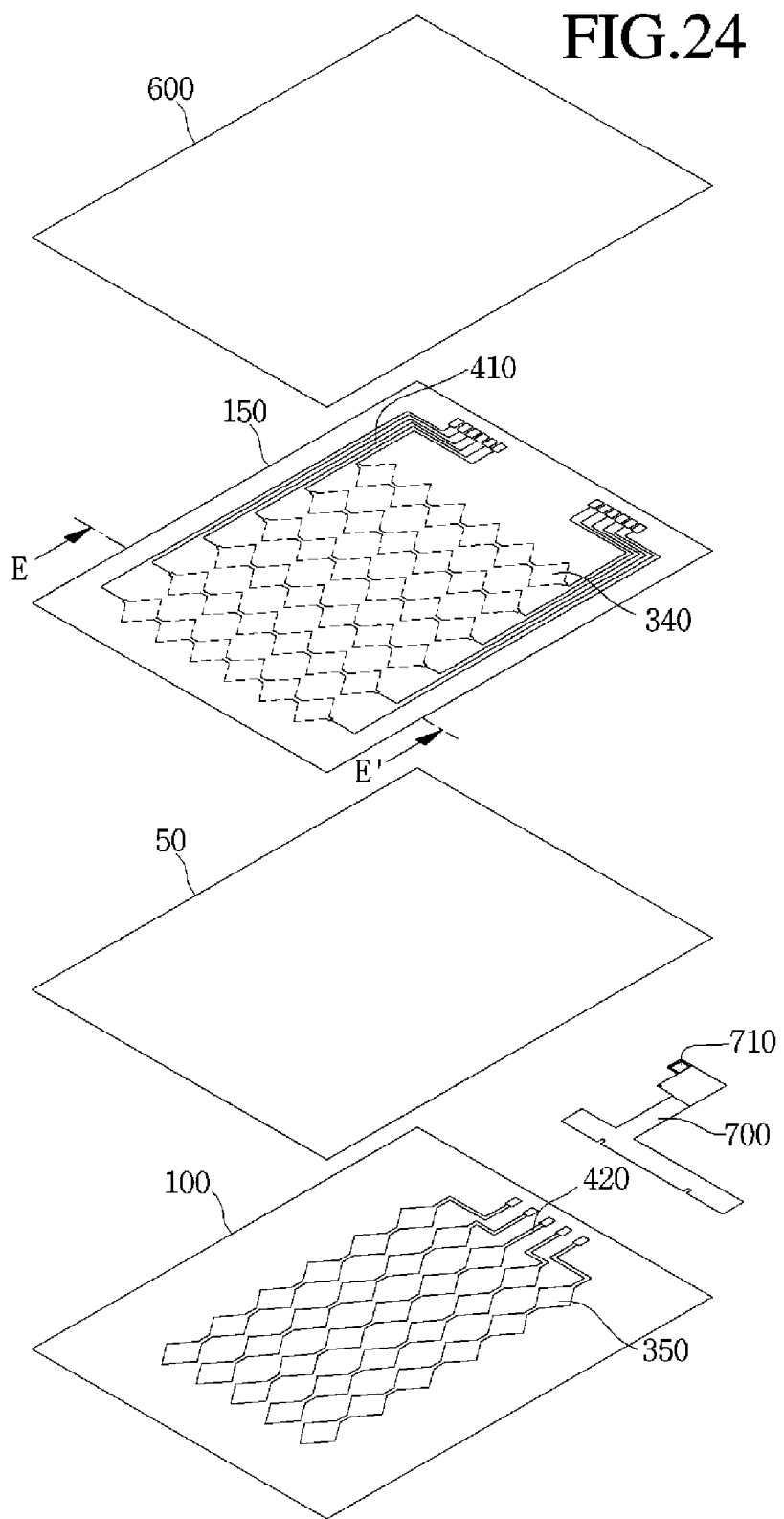
FIG. 24 is an exploded sectional view of a touch window according to still another embodiment.
Figure 25:
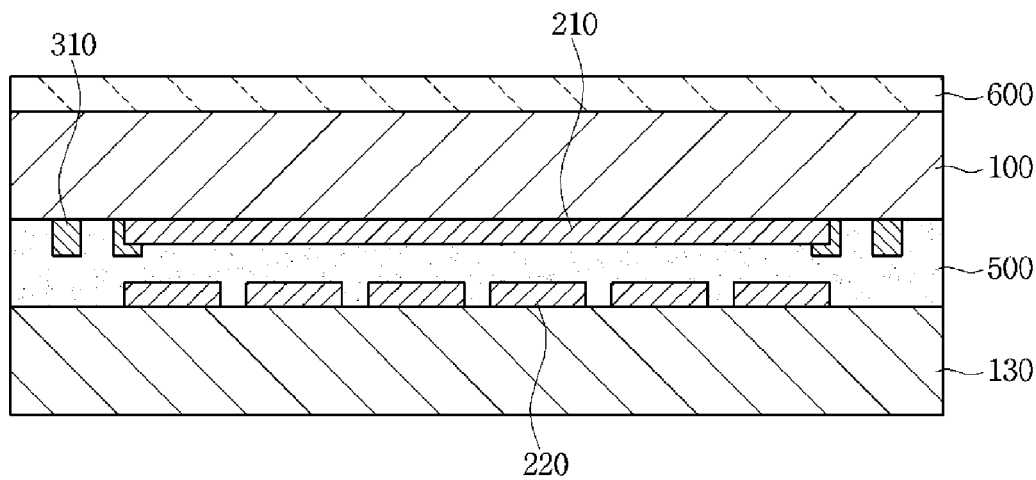
FIG. 25 is a sectional view taken along line E-E' of FIG. 24.

Meanwhile, referring to FIGS. 24 and 25, the first sensing electrode 340 may be formed on one surface of the cover substrate 150, and the second electrode 350 may be formed on one surface of the substrate 100 disposed on the cover substrate 150. Optical clear adhesive (OCA) 50 may be interposed between the cover substrate 150 and the substrate 100. In this case, the blocking layer 600 may be disposed on the cover substrate 150.

Figure 26:
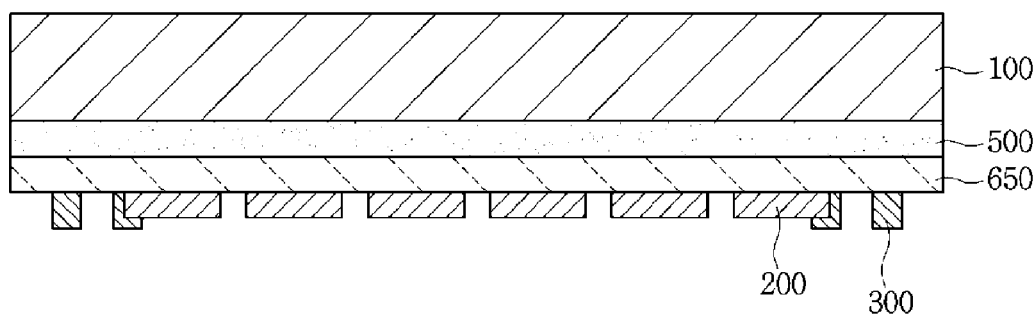
FIGS. 26 to 28 are sectional views showing a touch window according to still another embodiment.

Meanwhile, referring to FIG. 26, the blocking layer 650 may serve as the substrate. That is, the sensing electrode 300 and the wire 400 may be directly disposed on the blocking layer 650. The blocking layer 650 may be interposed between the touched surface of the cover substrate 150 and the sensing electrode 300. Thus, the sensing electrode 300 may be provided on a bottom surface of the blocking layer 650. That is, the cover substrate 150, the blocking layer 650 and the sensing electrode 300 may be sequentially stacked. Thus, the thickness of the touch window may be more thinly secured. Meanwhile, the optical clear adhesive 50 may be further disposed between the cover substrate 150 and the blocking layer 650.

In this case, the blocking layer 650 may include a base and a dye provided into the base. The base may include one of PET (polyethylene terephthalate), PC (polycarbonate), COC (Cyclic Olefin Copolymer) and COP (Cyclic Olefin Polymer). In addition, the dye may include one selected from the group consisting of azo dye, disperse dye and phthalocyanine dye.

The visibility may be improved through the blocking layer 650 and may be substituted for an electrode substrate, so that the thickness of the touch window may be secured to be thin.

Figure 27:
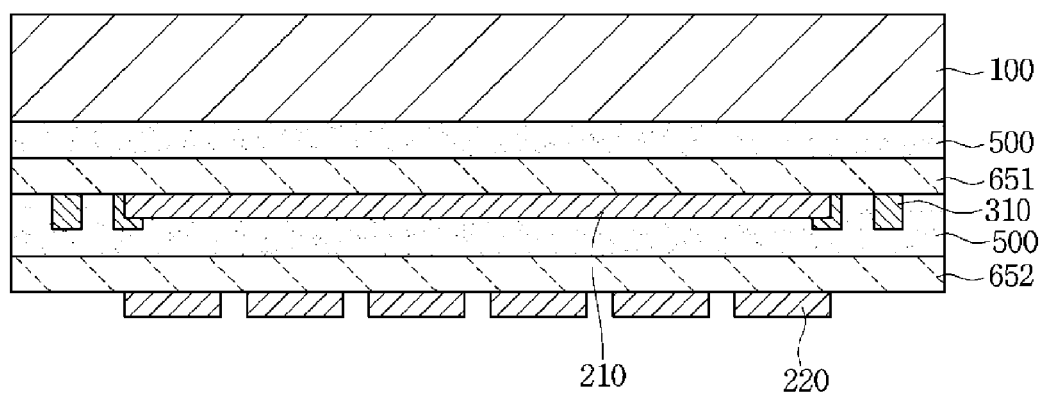

Referring to FIG. 27, the first sensing electrode 340 may be formed on the first blocking layer 651 disposed on the cover substrate 150, and the second sensing electrode 350 may be formed on the second blocking layer 652 disposed on the first blocking layer 651. The optical clear adhesive 500 may be interposed between the cover substrate 150 and the first blocking layers 651.

Figure 28:
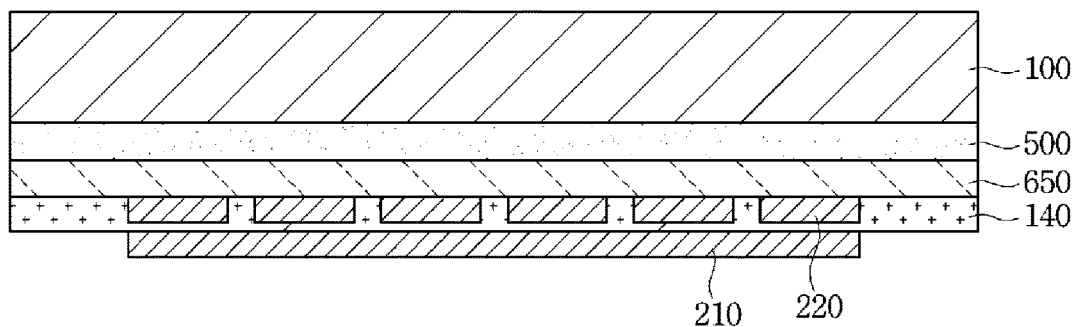

Referring to FIG. 28, the intermediate layer 140 may be disposed on the blocking layer 650. The intermediate layer 140 may be disposed on the second sensing electrode 350. The intermediate layer 140 may support the first sensing electrode 340.

The touch window may be provided on the display panel serving as the driving part. The touch window may be combined with the display panel to constitute the display. As shown in FIG. 27, the display may include a mobile terminal.

Figure 29:
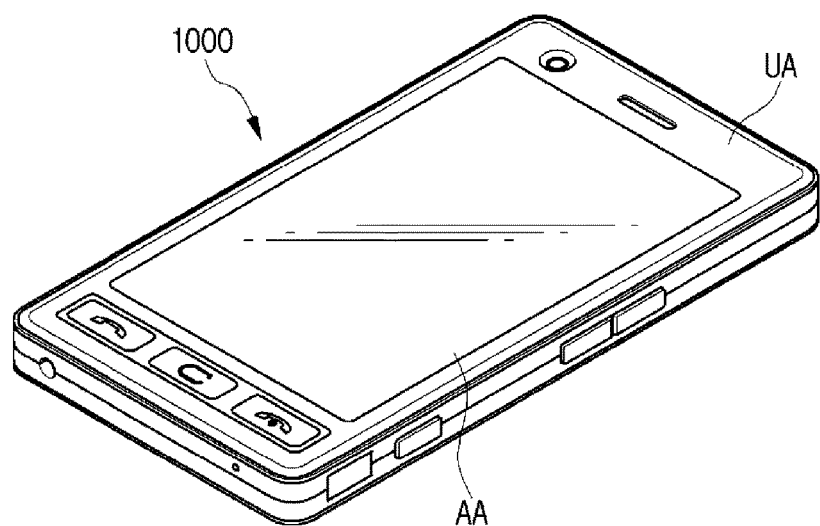
FIGS. 29 to 32 are perspective views showing touch devices according to various embodiments including a touch window according to an embodiment.

In particular, differently from that depicted in FIG. 29, the touch window may include a curved touch window. Therefore, the touch device including the touch window may include a curved touch device.

The display panel has a display region to output an image. The display panel applied to the display may generally include upper and lower substrates. The lower substrate may include data lines, gate lines, and thin film transistors (TFT). The upper substrate is bonded to the lower substrate to protect components provided on the lower substrate.

The display panels may be provided in various types depending on the type of the display according to the embodiment. In other words, the display according to the embodiment may include a liquid crystal display (LCD), a field emission display, a plasma display (PDP), an organic light emitting diode (OLED), and an electrophorectic display (EPD). Accordingly, the display panel may be configured in various types.

Figure 30:
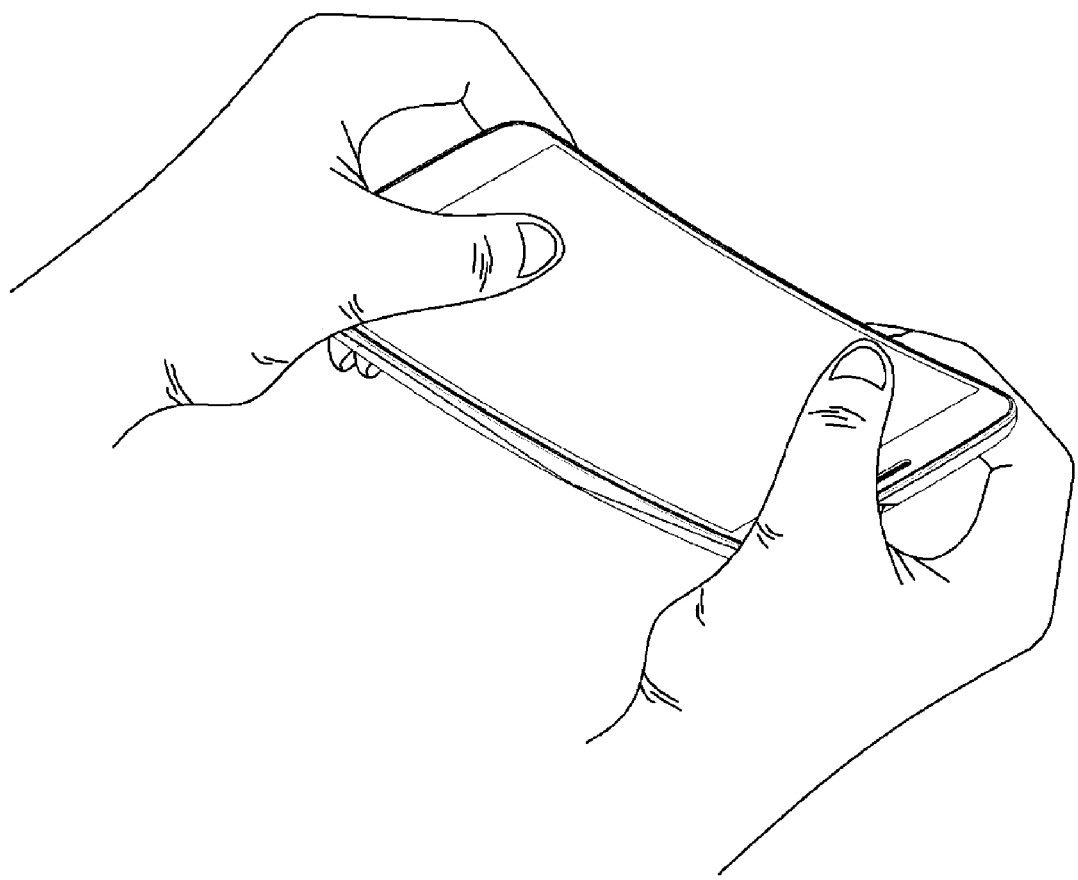

Meanwhile, referring to FIG. 30, the touch window may include a flexible touch window that is bendable. Accordingly, the display device including the touch window may be a flexible touch device. Therefore, a user may curve or bend the flexible touch window with a hand.

Figure 31:
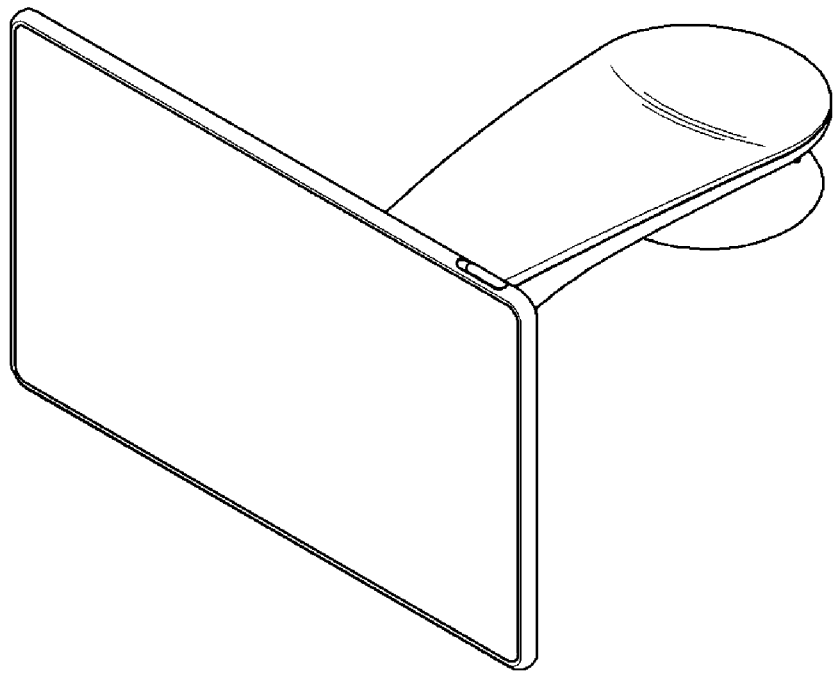

Meanwhile, referring to FIG. 31, the touch window may be applied into a vehicle as well as the touch device of a mobile terminal.

Figure 32:
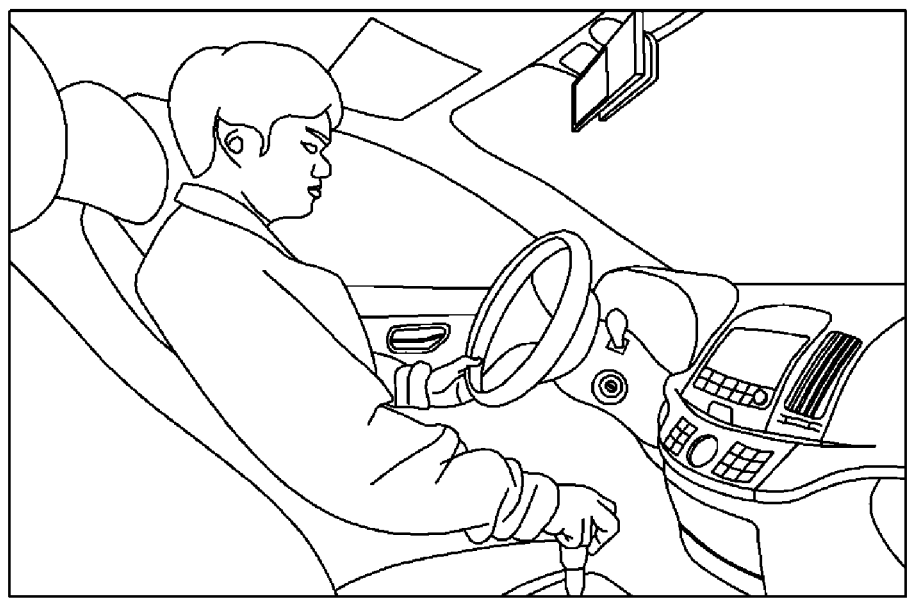

In addition, referring to FIG. 32, the touch window may be applied to an inner part of a vehicle. In other words, the touch window may be applied to various parts in the vehicle. Accordingly, the touch window may be applied to a dashboard as well as a PND (Personal Navigation Display), so that a CID (Center Information Display) may be realized. However, the embodiment is not limited to the above, and the touch device may be used for various electronic appliances.

The embodiment is to provide a touch window having improved reliability.

According to one embodiment, there is provided a touch window which includes a substrate divided into an active area and an unactive area; a first sensing electrode extending in a first direction on the active area of the substrate and including a plurality of first electrode parts and a connection part; a second sensing electrode extending in a second direction different from the first direction on the active area of the substrate and including a plurality of second electrode parts; an insulating layer disposed on top surfaces of the first electrode part of the first sensing electrode and the connection part to expose the second electrode part of the second sensing electrode; and a bridge electrode disposed on the insulating layer and connected to the exposed second electrode part of the second sensing electrode, wherein the insulating layer includes an open part.

According to another embodiment, there is provided a touch window which includes a substrate; a sensing electrode disposed on the substrate to sense a position; a wire electrically connected to the sensing electrode; and a blocking layer disposed on the sensing electrode to block a part of light.

According to the touch window of the embodiment, the insulating layer is formed on top surfaces of the connection part and the first electrode part of the first sensing electrode, so that a tolerance for connecting the second electrode part of the second sensing electrode to the bridge electrode may be secured.

Therefore, the second sensing electrode, the insulating layer and the bridge electrode may be prevented from being misaligned with each other. That is, a connection between the second sensing electrode and the bridge electrode may be improved and the first and second sensing electrodes may be prevented from being electrically connected to each other.

In addition, according to the touch window of the embodiment, the insulating layer is patterned and the sensing electrode is patterned by using the patterned insulating layer as a mask, so that the process may be simplified and the cost may be reduced. Further, the tolerance between the sensing electrode and the insulating layer may be omitted.

The touch window according to still another embodiment includes a blocking layer. The light having a short wavelength is blocked to be incident through the blocking layer, so that the visibility of the electrode may be improved. Specifically, the interconnecting structure has reflectance of about 30% to about 80% in the wavelength band of 300 nm to 800 nm, so that the interconnecting structure allows the visibility to deteriorate. In detail, the interconnecting structure may have reflectance of about 35% to about 75% in the wavelength band of 350 nm to 780 nm. In more detail, the interconnecting structure may have reflectance of about 37% to about 70% in the wavelength band of 380 nm to 700 nm. Thus, the light having a wavelength of 300 nm to 800 nm is blocked through the blocking layer, so that the reflectance may be reduced.

In addition, even when the electrode includes a metal weak in light reflection, the light reflectance may be reduced through the blocking layer.

Meanwhile, according to the touch window of another embodiment, by substituting the blocking layer for an electrode substrate, the visibility may be improved and in addition, the thickness of the touch window may be secured to be thin.

It will be understood that, when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings.

In the following description, when a part is connected to the other part, the parts are not only directly connected to each other, but also indirectly connected to each other while interposing another part therebetween. In addition, when a predetermined part "includes" a predetermined component, the predetermined part does not exclude other components, but may further include other components unless otherwise indicated.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrange-

What is claimed is:

1. A curved touch window for an organic light emitting device comprising:
   a substrate having an active area and an unactive area;
   a first sensing electrode extending in a first direction on the active area of the substrate, and the first sensing electrode including a plurality of first electrodes and a connector between adjacent first electrodes;
   a second sensing electrode extending in a second direction different from the first direction on the active area of the substrate, and the second sensing electrode including a plurality of second electrodes;
   an insulating layer provided over the plurality of first electrodes and the connector connecting adjacent first electrodes, and the insulating layer having a plurality of openings to expose the plurality of second electrodes;
   a first wire and a second wire on the unactive area of the substrate, wherein the first wire is coupled to the first sensing electrode, and the second wire is coupled to the second sensing electrode, wherein the insulating layer to make direct contact with only top surfaces of the first and second wires and to not make contact with side surfaces of the first and second wires, and the insulating layer to make direct contact with only top surfaces of the first and second sensing electrodes and to not make contact with side surfaces of the first and second sensing electrodes; and
   a bridge electrode provided over the insulating layer to connect adjacent second electrodes exposed through adjacent openings,
   wherein the second sensing electrode includes an opening area and a contact area, and the opening area of the second sensing area is defined as an area where the insulating layer is not disposed on the second electrodes, and the contact area is defined as an area of the opening area where the bridge electrode is in contact with the second electrode, wherein the bridge electrode extends over the insulating layer, downward toward the second electrode and extends in a direction away from the insulating layer such that the bridge electrode has a stepped portion from the second electrode to a top of the bridge electrode, and a size of the opening area is larger than a size of the contact area,
   wherein a width of the bridge electrode in the second direction is larger than a width of the connector of the first sensing electrode,
   wherein the sensing electrode includes an interconnecting structure, wherein the interconnecting structure has a reflectance of about 30% to about 80% in wavelength band of 300 nm to 800 nm, the interconnecting structure has a reflectance of about 35% to about 75% in the wavelength band of 350 nm to 780 nm, and the interconnecting structure has a reflectance of about 37% to about 70% in the wavelength band of 380 nm to 700 nm,
   wherein an intermediate layer is disposed on the substrate, and the intermediate layer includes a dielectric material.

2. The curved touch window of claim 1, wherein there is a one-to-one correspondence between a number of openings and a number of second electrodes.

3. The curved touch window of claim 1, further comprising:
   a cover substrate provided on the substrate on which the first and second sensing electrodes, the insulating layer and the bridge electrode are provided; and
   a transparent adhesive layer provided between the substrate and the cover substrate.

4. The curved touch window of claim 1, wherein the top surface or the second electrodes is exposed in the openings.

5. The curved touch window of claim 1, wherein the insulating layer directly contacts the top surfaces of the first and second sensing electrodes.

6. The curved touch window of claim 5, wherein the insulating layer directly contacts the top surfaces of the first and second wires.

7. The curved touch window of claim 1, wherein the first sensing electrodes and the bridge electrode are formed not to contact each other.

8. The curved touch window of claim 1, wherein an end of the insulating layer is disposed to be spaced apart from one end of the first or second sensing electrodes in the active area.

9. The curved touch window of claim 1, wherein an end of the insulating layer is disposed to be spaced apart from one end of the first or second wires in the unactive area.

10. The curved touch window of claim 1, the first electrodes are at least one shape selected from the group consisting of bar shape, polygonal shape, circular shape, linear shape, H-shape and elliptical shape.

11. The curved touch window of claim 10, the polygonal shape includes a triangular shape and a rectangular shape.

12. The curved touch window of claim 1, wherein the first and second sensing electrodes have a mesh shape.

13. The curved touch window of claim 1, wherein a shape of each of the openings corresponds to a shape of the opening area.

14. The curved touch window of claim 13, wherein the opening area is formed to be larger than a plane width of the bridge electrode.

15. The curved touch window of claim 1, wherein a size of the opening area is equal to or less than a size of the second electrode.

16. The curved touch window of claim 1, wherein the opening area has a same shape as the second electrode.

* * * * *